United States Patent
Troxell et al.

(10) Patent No.: US 9,309,841 B2
(45) Date of Patent: *Apr. 12, 2016

(54) SELF-CLEANING AIR FILTER

(71) Applicant: Maradyne Corporation, Cleveland, OH (US)

(72) Inventors: Jason D. Troxell, Forest Park, IL (US); Paul D. Ellsworth, Richfield, OH (US); Robert Dingess, Sagamore Hills, OH (US)

(73) Assignee: Maradyne Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,564

(22) Filed: Jan. 15, 2015

(65) Prior Publication Data

US 2015/0176545 A1 Jun. 25, 2015

Related U.S. Application Data

(63) Continuation-in-part of application No. 13/832,519, filed on Mar. 15, 2013, which is a continuation-in-part of application No. 13/748,406, filed on Jan. 23, 2013, now abandoned, which is a continuation of application No. 12/924,352, filed on Sep. 24, 2010, now Pat. No. 8,382,870.

(51) Int. Cl.
*B01D 46/00* (2006.01)
*F02M 35/08* (2006.01)
(Continued)

(52) U.S. Cl.
CPC ......... *F02M 35/086* (2013.01); *B01D 46/0005* (2013.01); *B01D 46/0068* (2013.01);
(Continued)

(58) Field of Classification Search
CPC ........... B01D 46/0005; B01D 46/0071; B01D 46/0042; B01D 46/0067; B01D 46/0068; B01D 46/0069; B01D 46/0082; B01D 46/0086; B01D 46/2403; B01D 46/4272; B01D 46/446; F02M 35/06; F02M 35/086
USPC ................. 95/279–280; 96/428; 55/282–305, 55/341.1–341.7, 361–382
See application file for complete search history.

(56) References Cited

U.S. PATENT DOCUMENTS 3,541,764 A * 11/1970 Astrom .............. B01D 46/0068
55/302
4,174,204 A 11/1979 Chase
(Continued)

FOREIGN PATENT DOCUMENTS

AU A-3318489 10/1989
EP 1 358 922 B1 11/2003
(Continued)

*Primary Examiner* — Thomas Bennett McKenzie
(74) *Attorney, Agent, or Firm* — Fay Sharpe LLP

(57) ABSTRACT

An air cleaner assembly includes a housing having an outer wall defining an air flow inlet, an air flow outlet and a hollow interior section. The housing is openable for service access to the interior section. A serviceable and selectively removable filter cartridge is positioned in the housing. The filter cartridge includes filter media surrounding an open central interior. A pulse jet distribution arrangement communicates with the interior of the housing and includes a device configured to direct a pulse of compressed gas into the interior of the filter cartridge. An evacuation valve arrangement is mounted to the housing to receive ejected dust from the filter cartridge and direct the received ejected dust out of the housing. The valve arrangement includes a frame, a blocking element mounted for reciprocation in relation to the frame and a biasing element for urging the blocking element into a closed position.

18 Claims, 18 Drawing Sheets

(51) Int. Cl.
  *B01D 46/24* (2006.01)
  *B01D 46/42* (2006.01)
  *B01D 46/44* (2006.01)

(52) U.S. Cl.
  CPC ........ *B01D46/0071* (2013.01); *B01D 46/0086* (2013.01); *B01D 46/2403* (2013.01); *B01D 46/4272* (2013.01); *B01D 46/446* (2013.01)

(56) References Cited

U.S. PATENT DOCUMENTS

| | | | |
|---|---|---|---|
| 4,214,882 A | 7/1980 | Brenholt | |
| 4,280,826 A * | 7/1981 | Johnson, Jr. | B01D 46/0001 55/302 |
| 4,452,616 A | 6/1984 | Gillingham et al. | |
| 4,826,512 A | 5/1989 | Fuller | |
| 4,836,834 A | 6/1989 | Steele | |
| 5,338,325 A | 8/1994 | Stanelle | |
| 5,762,689 A | 6/1998 | Hunziker | |
| 6,638,344 B2 | 10/2003 | Horton et al. | |
| 7,927,396 B2 | 4/2011 | Olson et al. | |
| 7,947,099 B2 | 5/2011 | Valentini | |
| 8,382,870 B2 | 2/2013 | Troxell et al. | |
| 8,404,021 B2 | 3/2013 | Gillingham et al. | |
| 2011/0011042 A1 | 1/2011 | Gillingham et al. | |
| 2011/0252964 A1 | 10/2011 | Wahlquist et al. | |
| 2013/0133298 A1 * | 5/2013 | Troxell | B01D 46/0068 55/283 |
| 2013/0239802 A1 * | 9/2013 | Troxell | B01D 46/0086 95/20 |

FOREIGN PATENT DOCUMENTS

| | | | |
|---|---|---|---|
| WO | WO 2007/149388 | 12/2007 | |
| WO | WO 2007149388 A2 * | 12/2007 | ......... B01D 46/0068 |

* cited by examiner

SELF-CLEANING AIR FILTER

The instant application is a continuation-in-part of U.S. application Ser. No. 13/832,519 which was filed on Mar. 15, 2013 and is still pending. That application is a continuation-in-part of U.S. application Ser. No. 13/748,406, which was filed Jan. 23, 2013 and is now abandoned. That application was, in turn, a continuation of U.S. application Ser. No. 12/924,352, filed Sep. 24, 2010 and issued on Feb. 26, 2013 as U.S. Pat. No. 8,382,870. The subject matter of each of the patent and the several applications is incorporated hereinto by reference in its entirety.

This disclosure relates to a self-cleaning air filter, and, in particular, a self-cleaning air filter for vehicles and motorized equipment.

BACKGROUND

Operating in dusty environments has long been a problem for equipment and vehicles. The respiration of dusty and contaminated air greatly hinders performance and can damage the vehicle or equipment's engines. Even though vehicles and equipment have filter elements that filter the inlet air flow, in extremely dusty environments, these filter elements quickly become caked with dust and debris, which retards and stops the air flow through the filter element to the engine. Consequently, these filter elements must be frequently cleaned to remove the deeply imbedded dust which penetrates into the filter element or the entire filter element must be replaced to ensure the proper operation of the equipment and vehicles. In extremely dusty environments, the demand of constantly cleaning and/or replacing filter elements comes at a significant cost of time and money.

A technique commonly referred to as "pulse jet" or "reverse pulse" self-cleaning has been used in industrial and large scale air filtration systems. Reverse pulse self-cleaning involves periodically releasing a quick burst ("pulse") of compressed air into the filter element, which expands through the filter element in the opposite direction of the normal airflow through the filter element. The rapidly expanding compressed air pulse passing out of the filter element dislodges the dust cake collected on the outside of the filter element, as well as some dust which has penetrated into the element pleat. While effective for industrial and large scale air filtration systems, reverse pulse self-cleaning, heretofore, has been inoperable for small air filtration systems, such as those for vehicles and other types of motorized equipment. Reverse pulse self-cleaning works in industrial and large scale air filtration systems because of the sheer volume of the filter housing and the volume of the filter housings in relation to the volume of the filter elements.

In industrial and large scale applications, multiple arrays of filter elements are disposed within large volume filter housings. These filter housings are spacious enough that the compressed air pulse can propagate through the filter elements to effectively clean them before energy of the pulse dissipates within the filter housing and the pressure differential equalizes returning the system to its normal filtering operation.

In small scale applications, such as for vehicles and motorized equipment, where space is limited, the filter housings lack the volume in relation to the volume of the filter elements to make reverse pulse self-cleaning operable or effective. In such applications, a single filter element is typically disposed within the limited confines of the filter housing. The filter housings provide little volume around the filter element within which a compressed air pulse can expand and dissipate. Consequently, an expanding compressed air pulse almost instantly equalizes the pressure differential between the inside and outside of the filter element within the filter housing, which prematurely terminates the expansion of the pulse through the filter element. As a result, the effectiveness of the pulse jet self-cleaning action is lost or greatly reduced.

One issue with cleaning such filters with a compressed air pulse is that adequate air pressure must be exerted through the filter in order to remove or dislodge the dust cake collected on the outside of the filter element. It would therefore be advantageous to provide a pulse jet distribution arrangement which is capable of distributing the air pulse at an adequate pressure so as to dislodge the particulates from the exterior surface of the filter.

BRIEF SUMMARY

In one embodiment the present disclosure relates to an air cleaner assembly comprising a housing including an outer wall defining an air flow inlet, an air flow outlet and a hollow interior section. The housing outer wall includes a side wall. The housing is openable for service access to the hollow interior section. A serviceable filter cartridge is positioned in the housing hollow interior section. The filter cartridge is selectively removable from the air cleaner housing, with the filter cartridge comprising filter media surrounding an open central interior. A pulse jet distribution arrangement communicates with the hollow interior section of the housing. It includes a device configured to direct a pulse of compressed gas into the open central interior of the filter cartridge. An evacuation valve arrangement is mounted to receive ejected dust from the filter cartridge and is adapted to direct the received ejected dust out of the air cleaner housing. The valve arrangement comprises a frame, a blocking element mounted for reciprocation in relation to the frame and a biasing element for urging the blocking element into a closed position.

In another embodiment of the present disclosure, a self-cleaning air filter assembly which is connected to an associated compressed air source comprises a housing defining a chamber located therein and a hollow filter element disposed within the chamber such that an interior volume is defined within the filter element and an exterior volume is defined between the filter element and an interior wall of the housing. During a filtering cycle, a negative pressure differential between the interior volume and the exterior volume draws airflow inward through the filter element. During a self-cleaning cycle, a positive pressure differential between the interior volume and the exterior volume forces air flow outward through the filter element. A nozzle is configured to direct a pulse of compressed gas into the interior volume of the filter element. A valve in communication with the housing and connected to an associated compressed air source is provided for selectively releasing a pulse of compressed air into the nozzle whereby dust is dislodged from the exterior surface of the filter element into the housing chamber. A vent is mounted to the housing over an opening therein for venting the pulse of compressed air from the housing. The vent comprises a frame, a blocking element mounted for reciprocation in relation to the frame and a biasing element for urging the blocking element into a closed position.

BRIEF DESCRIPTION OF THE DRAWINGS

The drawings illustrate several embodiments of the present disclosure, in which.

DETAILED DESCRIPTION

Figure 1:
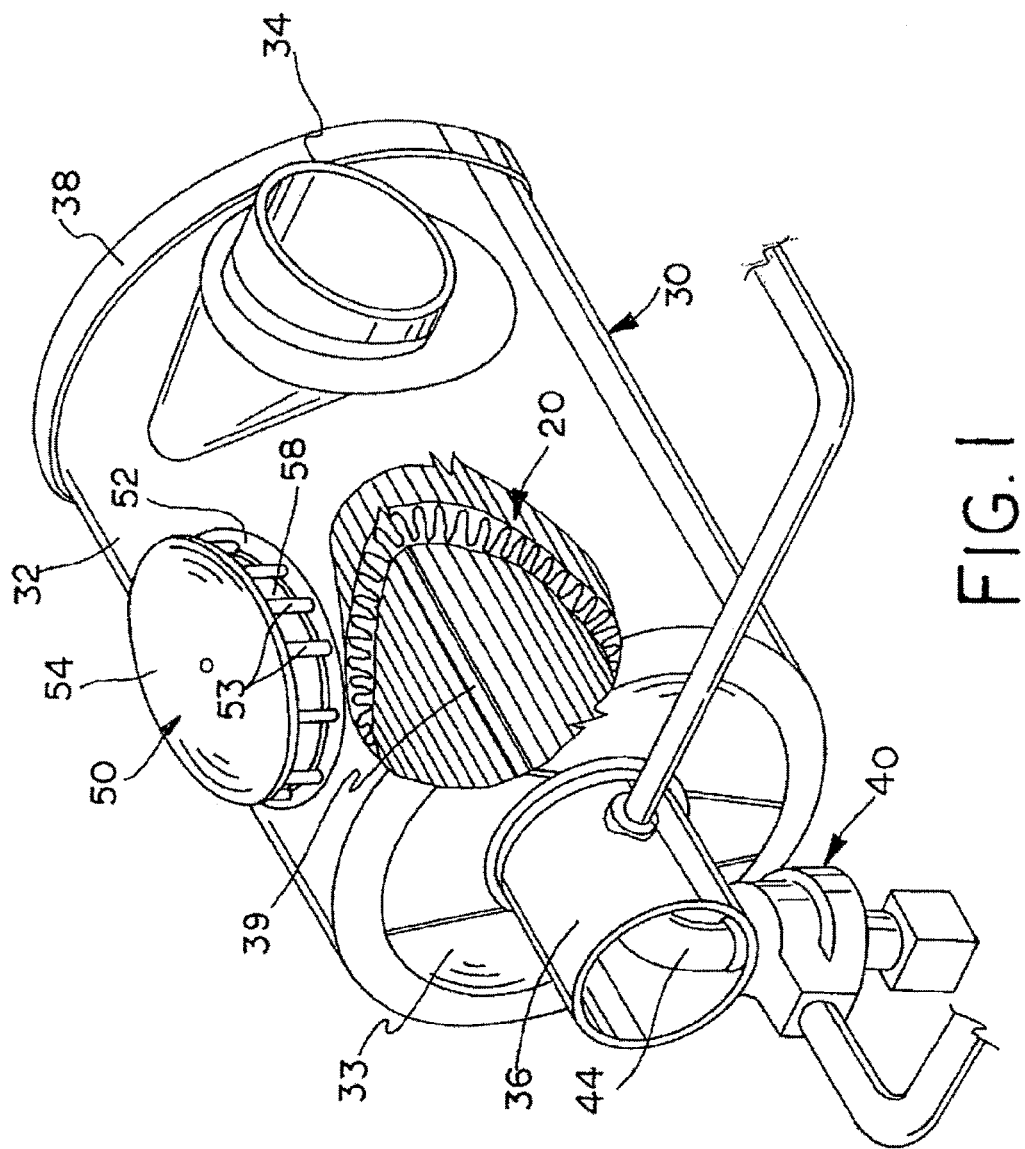
FIG. 1 is a perspective view, partially broken away, of an air cleaner assembly including an air filter according to a first embodiment of the present disclosure.
Figure 2:
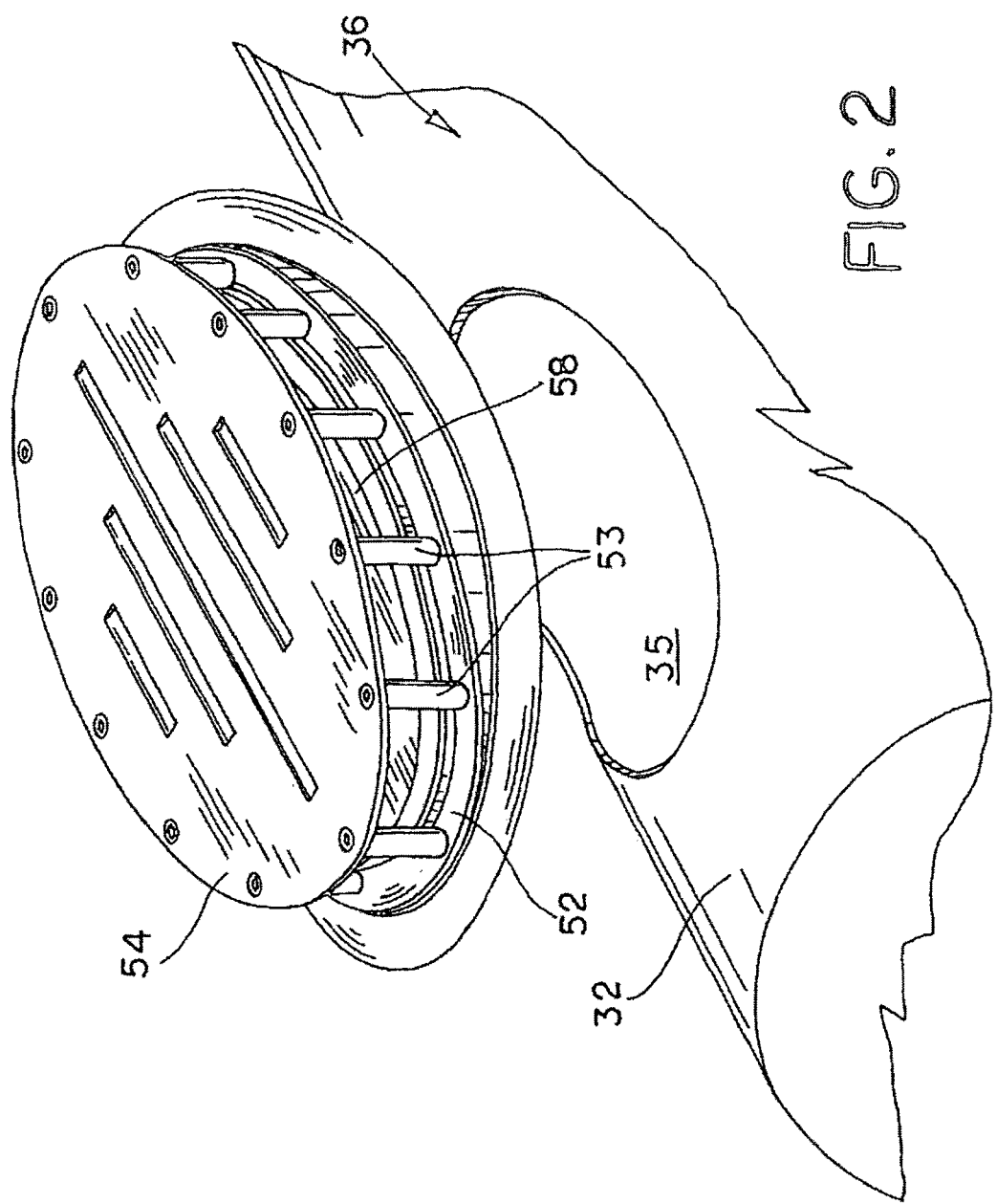
FIG. 2 is an enlarged partial exploded view of the air filter of FIG. 1 showing a pressure relief valve and a portion of a housing.
Figure 3:
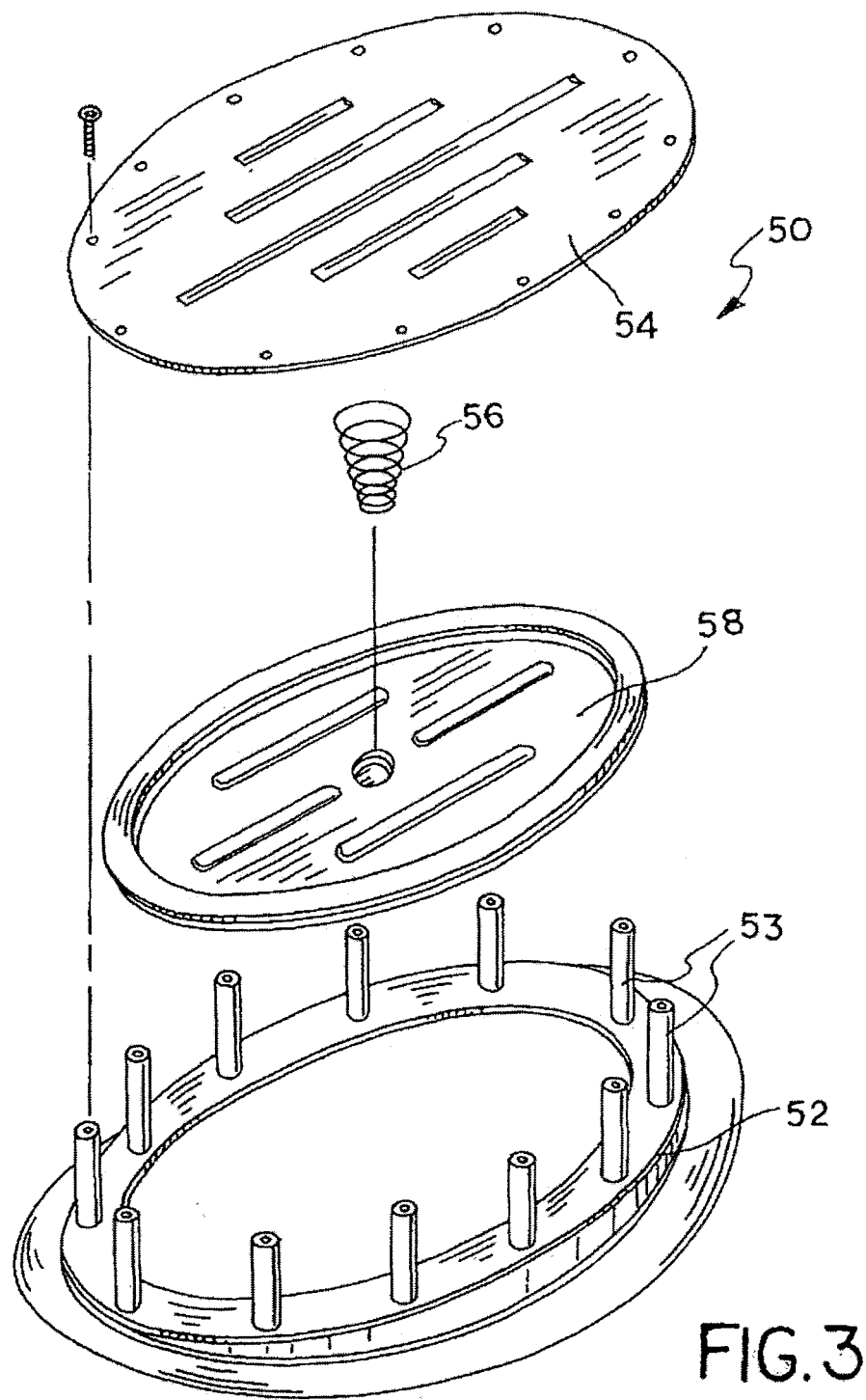
FIG. 3 is an exploded perspective view of the pressure relief valve of FIG. 2.
Figures 4, 5:
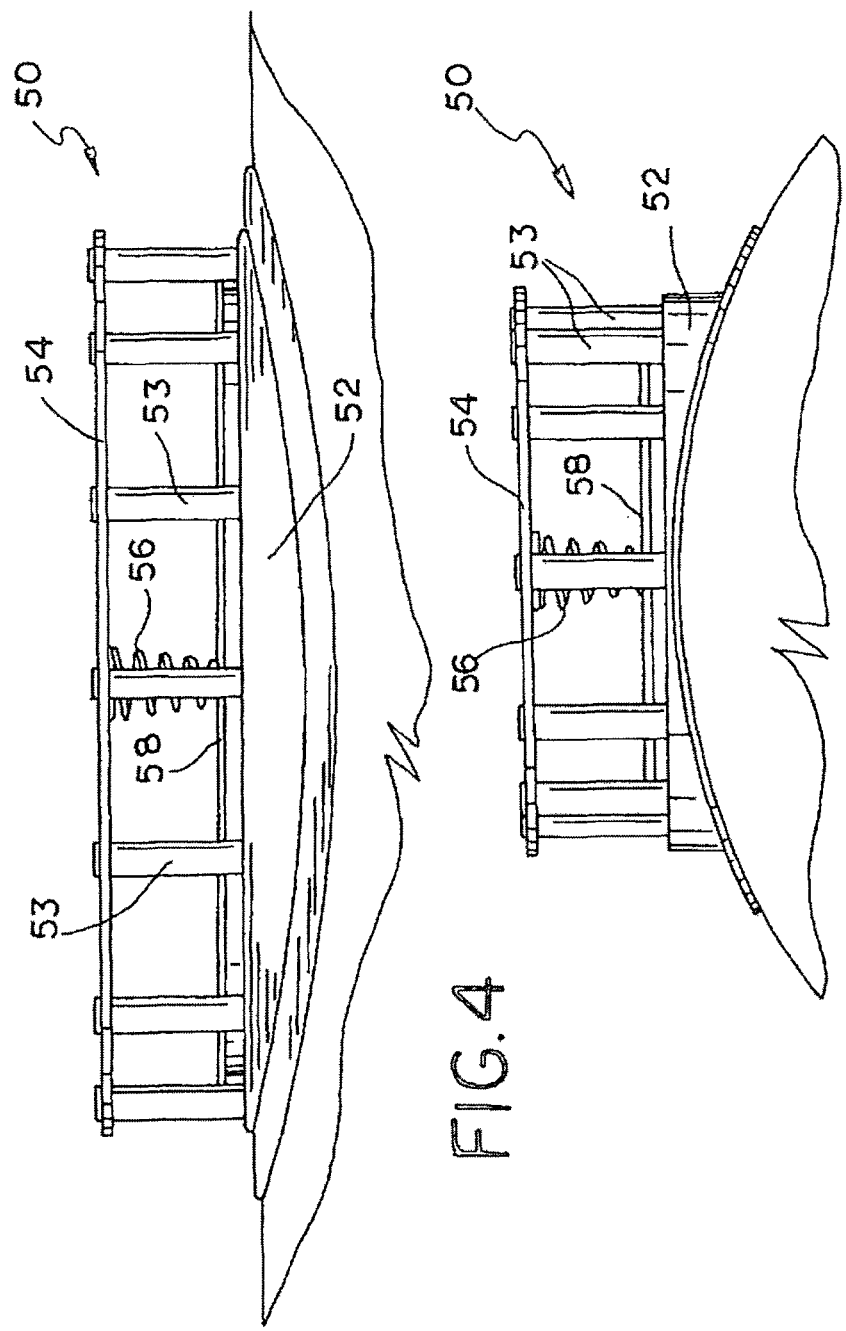
FIG. 4 is an assembled side elevational view of the pressure relief valve of FIG. 3.
FIG. 5 is an end elevational view of the pressure relief valve of FIG. 4.
Figure 6:
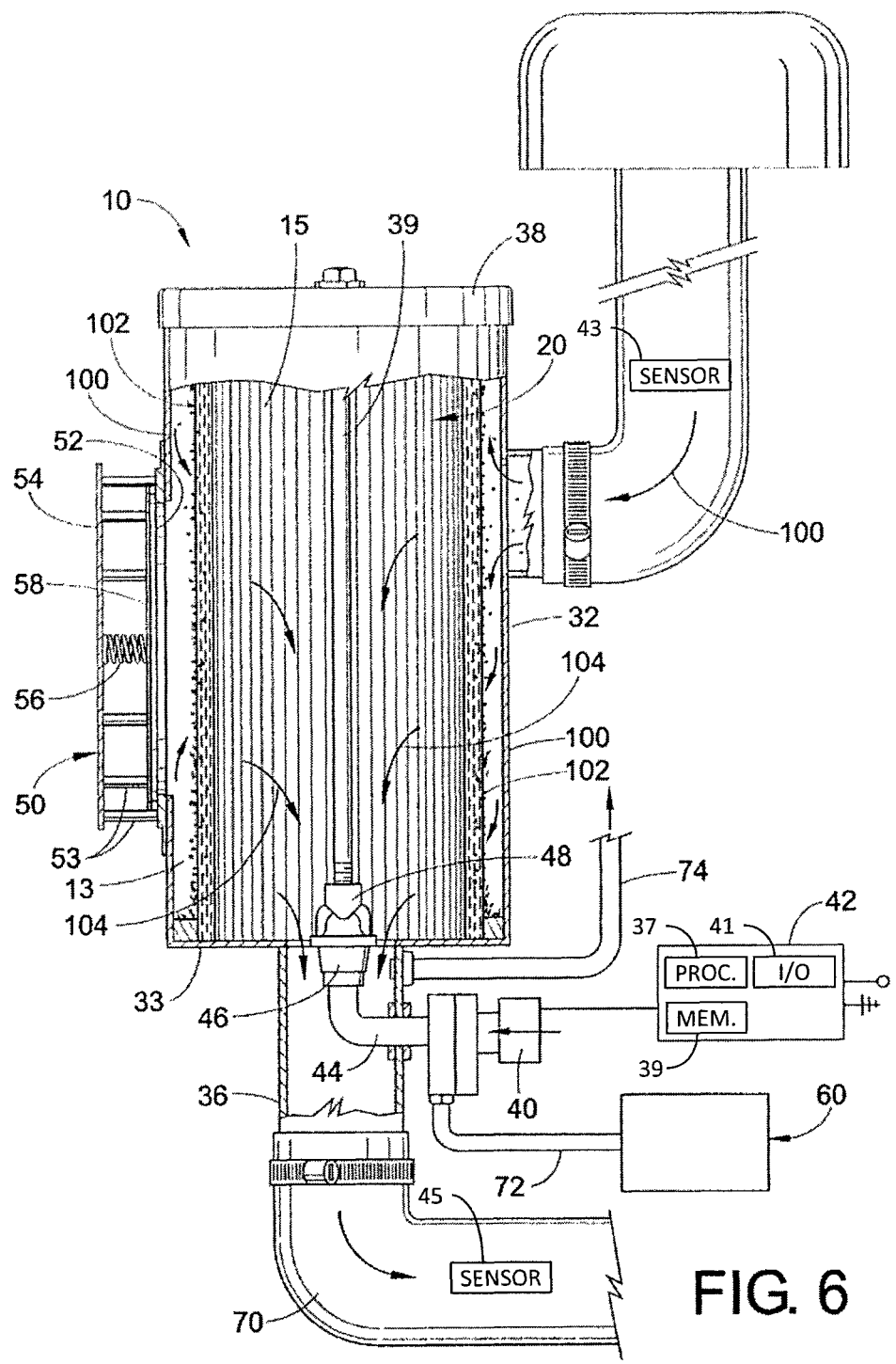
FIG. 6 is a side sectional view of the air filter of FIG. 1 shown during a normal filtering cycle.
Figure 7:
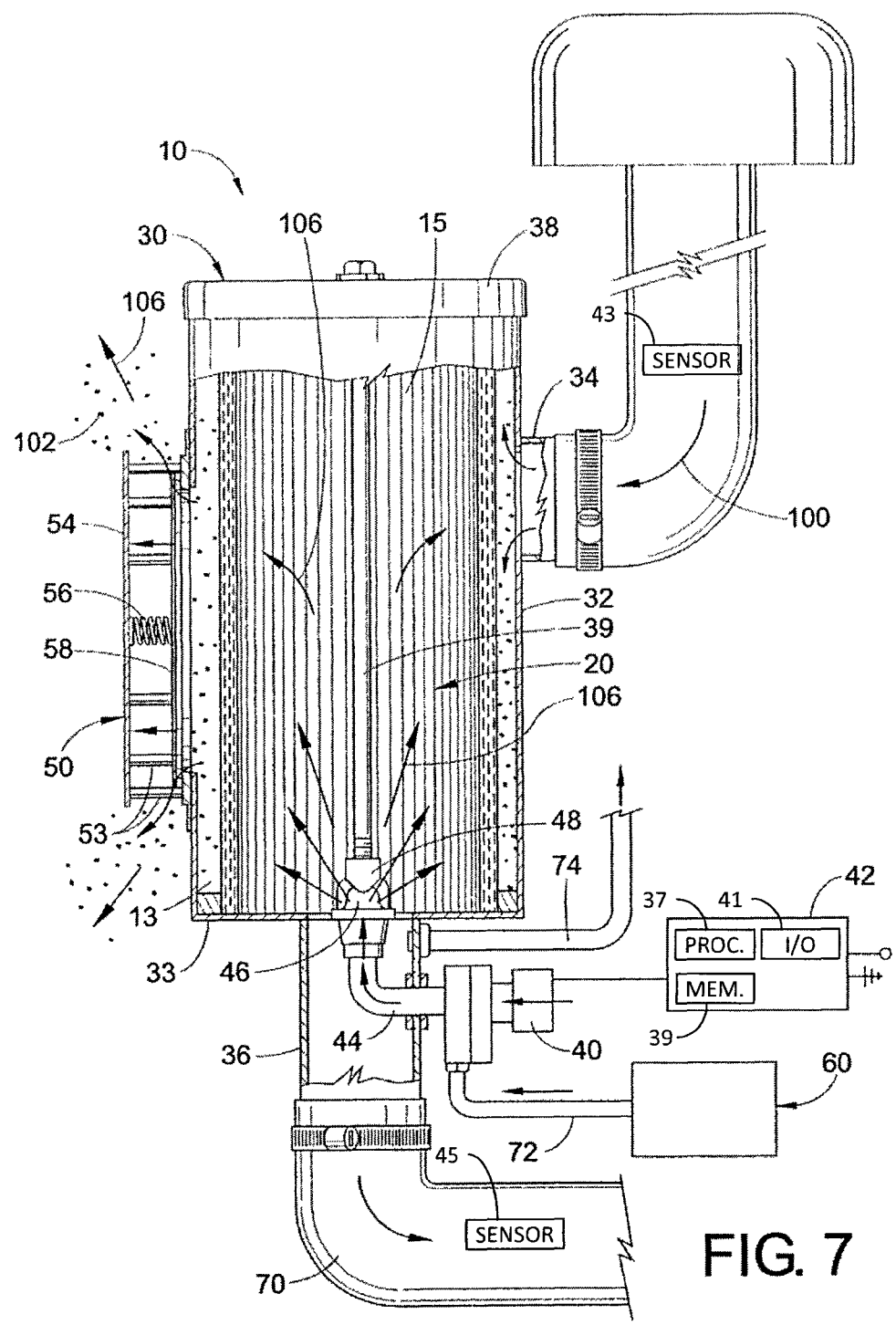
FIG. 7 is a side sectional view of the air filter of FIG. 6 shown during a cleaning cycle.

FIGS. 1-13 illustrate an embodiment of an air cleaner assembly including a self-cleaning air filter according to the present disclosure, which is designated generally as reference numeral 10. As shown, air filter 10 includes a tubular filter element 20 disposed within a cylindrical filter casing 30. Filter element 20 is of conventional design and function having a tubular sidewall of pleated filter material, which collects dust and debris as air passes through. Filter element 20 is typically constructed of a blend of cellulose and synthetic fibers. Further, a synthetic fine fiber coating is typically applied to the surface of the media. Other constructions are, however, contemplated. For example, filter element 20 can be constructed of all synthetic fibers rather than conventional paper. Filter element 20 is axially centered within filter casing 30. The tubular sidewall of filter element 20 is inset from the casing sidewalls defining an open space 13 around the outside of the filter element. The tubular sidewall also defines an open interior space 15 within filter element 20. Filter casing 30 has an open end enclosed by a removable lid 38. Lid 38 allows filter element 20 to be replaced as desired. Lid 38 is secured to casing 30 by connecting rod 39, which extends axially through filter element 20. Filter casing 30 includes an exterior surface 32 and an inlet port 34, through which dust laden air 100 from the atmosphere enters one end (the "inlet end") of air filter 10 and an outlet port 36 through which clean filtered air 104 exits the opposite end (the "outlet end") of the air filter. As shown, inlet port 34 extends tangentially from the casing sidewall at the inlet end of filter casing 30 and an outlet port 36 that extends axially from the casing bottom 33 at the outlet end of casing 30. Outlet port 36 allows for connection to the air intake and fuel induction system of a combustion engine by a hose, pipe or duct, although air filter 10 can be integrally mounted to the engine's air intake and fuel injection systems as desired.

A pulse valve 40 is mounted to the side of outlet port 36 and operably connected to a compressed air source 60. Pulse valve 40 releases short blasts or pulses of compressed air from the compressed air source within filter element 20, which facilitates the self-cleaning action of air filter 10. In one embodiment, pulse valve 40 is a conventional solenoid type control valve where a solenoid (not shown) actuates a diaphragm (not shown) to open and close the valve. Pulse valve 40 is mounted to the side of outlet port 36. An elbow 44 connects the output of pulse valve 40 to a nozzle head 46, which is centered along the longitudinal axis of filter casing 30. Nozzle head 46 includes a conical deflector 48, which deflects the pulse of compressed air radially through filter element 20. Pulse valve 40 is under the control of an electronic control module 42, which actuates the solenoid to open and close the valve at predetermined intervals. Control module 42 is electrically powered by any available internal or external power source, but is generally powered using the electrical power source found in the equipment or vehicle. Control module 42 may include processing circuitry 37, memory 39 and an I/O interface 41 for connection to other control system sensors and devices. The processing circuitry generally includes a suitable general purpose computer processing circuit, such as a microprocessor and its associated circuitry. The processing circuit is operable to carry out the operations attributed to it herein. Within the memory are various program instructions. The program instructions are executable by the processing circuit and/or any other components of the control module 42 as appropriate. If desired, one or more of the components of the control module 42 may be provided as a separate device, which may be remotely located from the other components of the control module.

In some embodiments, control module 42 controls pulse valve 40 based on flow through air filter 10. In that regard, control module 42 receives measurements of parameters that can be used to measure air flow, or estimate air flow, through air filter 10 from one or more sensors 43, 45. Such parameters can include, for example, one or more of a) air pressure at inlet port 34; b) air pressure at the outlet port 36; c) air flow at the inlet port; and d) air flow at the outlet port. One or more sensors 43, 45 can include, for example, one or more of air flow sensors (e.g., pitot tubes and/or anemometers) and air pressure sensors (e.g., vacuum transducers). Also, one or more sensors 43, 45 can be used independently or concurrently. In one embodiment, a first vacuum transducer 43 measures air pressure at inlet port 34 and a second vacuum transducer 45 measures air pressure at outlet port 36. Received parameter measurements are applied to a model relating the parameters to pulse rate to determine how to control pulse valve 40. Pulse valve 40 is then controlled to pulse in accordance with the determination. One such model is described in connection with FIGS. 10-13, discussed below.

Further, in some embodiments, control module 42 can interface with external systems and/or devices over SAE J1939/CAN OPEN protocols using I/O interface 41. Using these protocols, control module 42 can be programmed and/or configured. For example, user-defined constants used in the model can be set using these protocols. As another example, the model can be configured and/or specified using these protocols.

Air filter 10 also includes a spring loaded pulse pressure vent (PPV) 50, which vents the compressed air pulse from filter casing 30 during the self-cleaning cycle of air filter 10. PPV 50 also acts as a vent for the dust removed during cleaning to be blown out of the housing. PPV 50 vents the over-pressure on the outside of filter element 20 from the compressed air pulse so that a pressure differential is maintained between the inside and outside of the filter element so that the cleaning action is maintained through the cleaning cycle. PPV 50 also acts as a vent for the dust removed during cleaning to be manually blown out of filter casing 30. PPV 50 is mounted between the inlet and outlet ends of filter casing 30 within an opening 35 in the casing sidewall. PPV 50 includes an annular mounting pad 52, which is securely seated within opening 35 of filter casing 30. A plurality of spacers or posts 53 extending from mounting pad 52 suspend a cover plate 54 over opening 35. A helical spring 56 biases a rigid diaphragm with a pliable seal 58 against mounting pad 52 to hold PPV 50 closed sealing filter casing 30. Spring 56 is selected so that PPV 50 opens at a predetermined positive pressure within filter casing 30.

During the normal filtering cycle (FIG. 6), the operation of the combustion engine creates a negative pressure differential between the inside and outside of filter element 20, which draws the airflow through air filter 10. Dust laden air from the atmosphere enters air filter casing 30 through inlet port 34. The dust laden air surrounds filter element 20 in area 13 and is drawn inward through the filter element 20 where dust and debris collect on the outside of the filter element. The now "filtered" air exits air filter 10 to the engine through outlet port 36. As shown, PPV 50 is closed during the normal filtering cycle.

During the cleaning cycle (FIG. 7), pulse valve 40 releases a short powerful blast of compressed air (the "compressed air pulse") into filter element 20, which dislodges dust and debris 102 from the filter element into area 13 thereby providing the self-cleaning action of air filter 10. Nozzle head 46 directs the compressed air pulse onto the deflector 48, which projects the compressed air pulse outward radially into the filter element. The compressed air pulse creates a high pressure wave that expands outward radially through filer element 20 as it moves along the length of filter element 20 from the outlet end to the inlet end. The high pressure wave created by the compressed air pulse briefly inverts the pressure differential between the inside and outside of filter element 20 and temporarily reverses the direction of air flow through filter element 20 thereby providing the cleaning action. In releasing the compressed air pulse, pulse valve 50 opens only for a brief duration generally 5-10 milliseconds. The cleaning cycle is maintained only as long as the positive pressure differential between the inside and outside of the filter element can be maintained. Consequently, the cleaning cycle lasts less than a few tenths of a second.

During the brief cleaning cycle, the over pressure of the compressed air pulse expanding through filter element 20 immediately opens PPV 50. PPV 50 opens once the internal air pressure of filter casing 30 reaches its predetermined pressure. PPV 50 opens to vent the compressed air pulse to the atmosphere thereby maintaining the now positive pressure differential between the inside and the outside of filter element 20. Venting the compressed air pulse to the atmosphere sustains the cleaning action for the entire duration of the pulse and allows the high pressure wave of the compressed air pulse to traverse the length of the filter element providing an efficient cleaning of the entire filter element. Without PPV 50 venting the compressed air pulse to the atmosphere, the pressure differential between the inside and outside of filter element 20 would quickly equalize within the confined space of filter casing 30 thereby interrupting the cleaning action provided by the compressed air pulse. Once the compressed air pulse has been vented from filter casing 30, the positive pressure differential is lost and the vacuum draw from the outlet port 36 quickly reestablishes the negative pressure differential between the inside and outside of the filter element, whereby the air flow direction through air filter 10 reverts back and the normal filtering cycle is reestablished.

Figure 8:
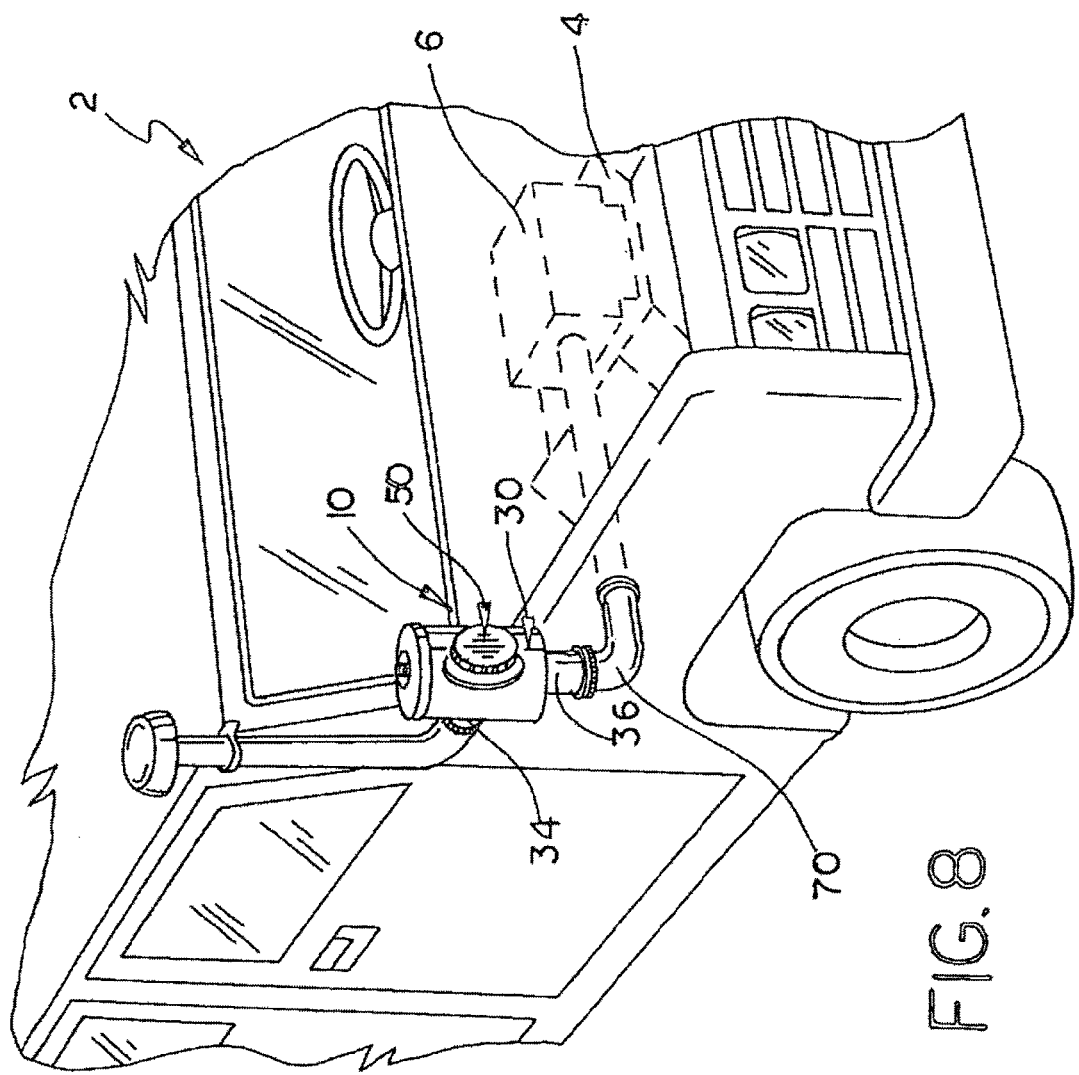
FIG. 8 is a partial perspective view of an exemplary application of the air cleaner assembly of FIG. 1 used in a typical military style vehicle.
Figure 9:
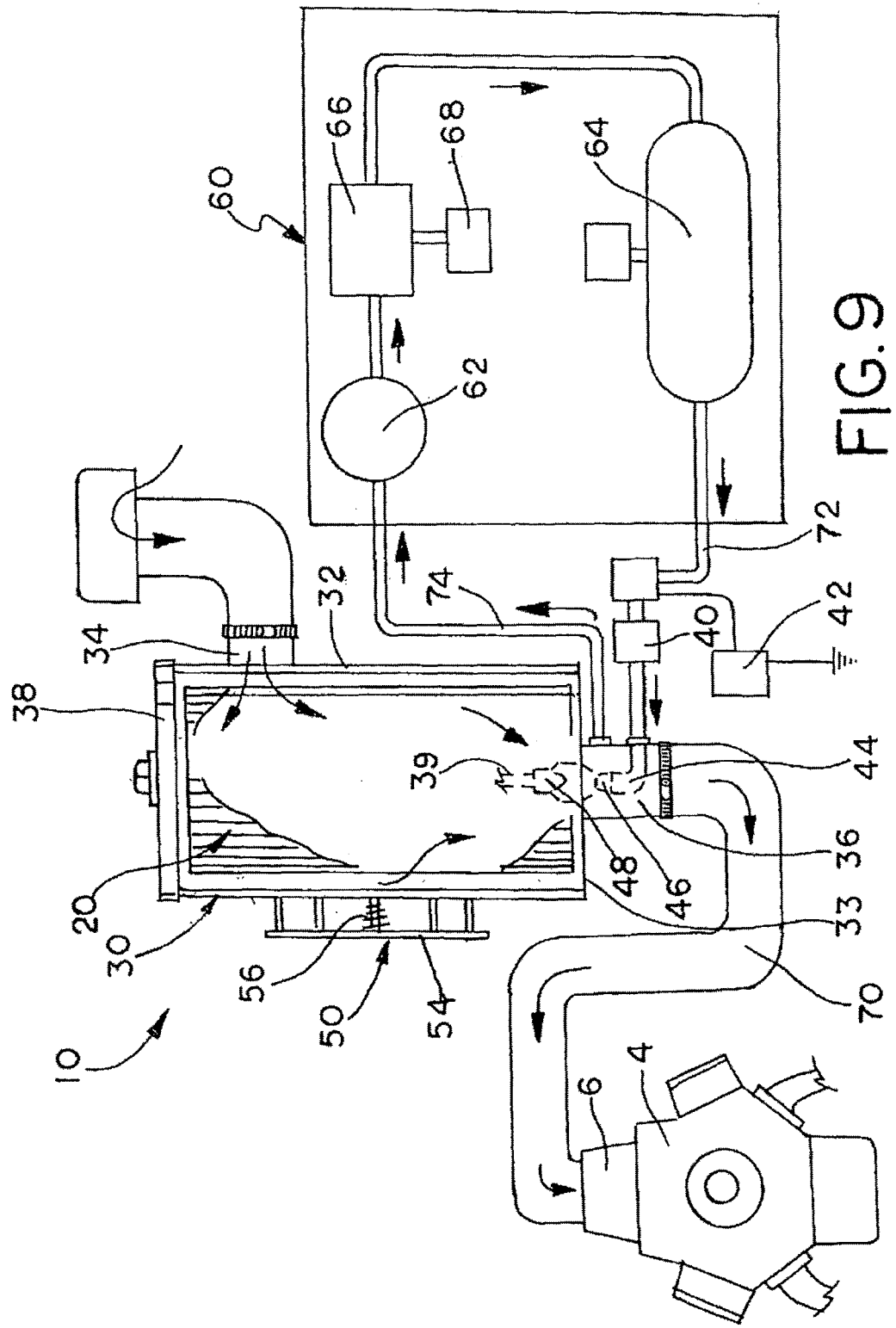
FIG. 9 is a simple schematic view of the air filtration system using the air cleaner assembly of FIG. 1.

In certain embodiments, air filter 10 forms part of an integrated air filtration system in equipment or vehicles powered by any internal combustion engine that operates in environments with extremely high contents of dust, sand and other particulate in the atmosphere. By way of example only and for simplicity of illustration and explanation, FIGS. 8 and 9 illustrate the application of air filter 10 to an air filtration system of a military type vehicle 2. In other embodiments, the air filtration system and the air filter may take other forms and be adapted for the desired application within the scope of this invention.

FIG. 8 depicts air filter 10 mounted to vehicle 2 outside of the engine compartment. The compressed air source (not shown in FIG. 8) is typically mounted to the vehicle undercarriage or within the engine compartment, which contains an engine 4. It should be noted that in other applications, air filter 10 and the compressed air source may be located in any available space and suitable location on, in or outside of the vehicle or equipment as desired for the particular application.

FIG. 9 depicts a schematic of air filter 10 incorporated into an air filtration system of vehicle 2. Pulse valve 40 is connected to compressed air source 60 by air line 72. Another airline 74 supplies compressed air source 60 with filtered and dried air from outlet port 36 of air filter 10 thereby ensuring that the volume of compressed air supplied back to pulse valve 40 is contaminant and moisture free. A hose, pipe or duct 70 connects outlet port 36 of air filter 10 to the engine's air intake and fuel injection system 6.

Compressed air source 60 supplies the volume of clean dry compressed air to air filter 10 from which the compressed air pulse is released within filter element 20 to facilitate the self-cleaning action. The necessary volume and pressure of the compressed air supplied from the compressed air source is determined by several factors, including, but not limited to the volume and configuration of air filter 10, the type of filter element 20, the volume and properties of dust within the inlet airflow, and the frequency of the air filter's cleaning cycle. Air filter 10 can be connected to any suitable and available compressed air source, whether specifically dedicated to supplying the air filter or one presently existing in the equipment or vehicle application that is available to supply the air filter. As shown, compressed air source 60 includes a compressor unit 62, a storage tank 64, a compressed air dryer 66 and moisture drain switch 68. Compressed air source 60 may also include other ancillary components (not shown), such as, but not limited to, compressed air filters, water purge valves, pressure gages and switches, hoses, lines, clamps and fittings. Generally, the components which make up the compressed air source 60 are of conventional design well known in the art. Compressor unit 62, storage tank 64 and other components of compressed air source 60 are selected so that the compressed air source supplies air filter 10 with the volume of clean, dry compressed air necessary for generating the required compressed air pulse within the air filter.

One skilled in the art will note that this invention enables the use of reverse pulse self-cleaning in small scale applications, such as for vehicles and motorized equipment. The pulse pressure vent compensates for the filter casing's small confined volume where the compressed air pulse is normally dissipated in large industrial systems by venting the compressed air pulse from the casing. The pulse pressure vent opens at a preset positive pressure so that the compressed air pulse vents to the atmosphere once it passes through the filter element. The pulse pressure vent maintains the positive pressure differential between the inside and outside of the filter element, which sustains the cleaning action during the cleaning cycle. Without the pulse pressure vent, the compressed air pulse would almost instantly expand within the confined volume of the filter casing and equalize the pressure differential between the inside and the outside of the filter element abruptly terminating the cleaning action before the pulse could clean the entire filter element. Venting the compressed air pulse through the pulse pressure vent allows the pressure wave of the pulse to travel the length of the filter element and the energy in the pulse to effectively dislodge dust from the filter element. The vent also provides an egress path from the filter casing for the dust and debris during the cleaning cycle. The pulse pressure vent can be readily adapted for filter housings of any size, configuration or capacity in a variety of vehicle, equipment and other applications. In addition, the pressure setting, size, configuration and location of the pulse pressure valve between the inlet and outlet ends of the filter casing is selected so that the compressed air pulse can be vented as the pulse travels the length of the filter element, thereby ensuring the entire area of the filter element will be cleaned.

FIGS. 10-13 illustrate a flowchart of a method 100 by which control module 42 controls pulse valve 40 to clean air filter 10. Method 100 can be implemented as program instructions stored in memory 39 of control module 42 and executed by processing circuitry 37 of control module 42. The flowchart spans from a beginning-of-life 102 of air filter 10 to an end-of-life 104 of the air filter. Beginning-of-life 102 corresponds to the point in the life cycle of air filter 10 when the air filter has not been used or is clean. End-of-life 104 corresponds to the point in the life cycle of air filter 10 when the air filter is no longer performing according to specification or is otherwise unsuitable for continued air filtering.

Figure 10:
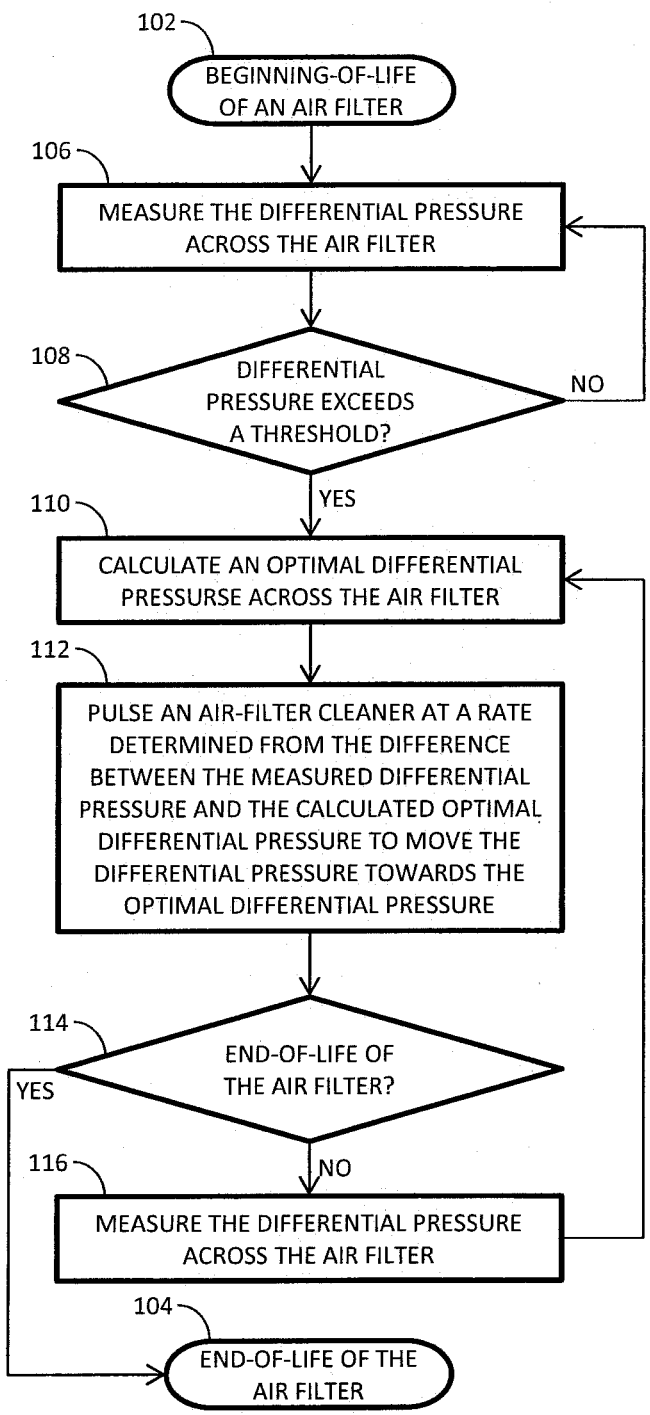
FIG. 10 is a flow chart of a method for controlling a pulse valve employed for cleaning the air filter of FIG. 1.

Referring to FIG. 10, at beginning-of-life 102 of air filter 10, a current differential air pressure $\Delta P_{ACT}$ across inlet port 34 and outlet port 36 is measured 106 during normal operation of the vehicle. In one embodiment, to measure differential pressure $\Delta P_{ACT}$, an air pressure $IP_{ACT}$ at inlet port 34 during normal operation of the vehicle is measured using first vacuum transducer 43 and an air pressure $OP_{ACT}$ at outlet port 36 during normal operation of the vehicle is measured using second vacuum transducer 45. Thereafter, the difference between the two pressures is calculated to determine differential pressure $\Delta P_{ACT} = OP_{ACT} - IP_{ACT}$. In another embodiment, differential pressure $\Delta P_{ACT}$ is estimated from pressure $IP_{ACT}$.

To estimate differential pressure $\Delta P_{ACT}$, pressure $IP_{ACT}$ is measured using first vacuum transducer 43. Further, an air pressure $OP_{HI}$ at outlet port 36 and an air pressure $IP_{HI}$ at inlet port 34 are determined when the vehicle engine is at full load or high idle and air filter 10 is new and clean. Thereafter, the ratio between pressure $IP_{ACT}$ and pressure $IP_{HI}$ is determined:

$$\frac{IP_{ACT}}{IP_{HI}}.$$

The ratio is applied to scale a differential air pressure $\Delta P_{HI} = OP_{HI} - IP_{HI}$ across air filter 10 when the vehicle engine is at full load or high idle and air filter 10 is new and clean is determined:

$$\Delta P_{HI} \frac{IP_{ACT}}{IP_{HI}}.$$

This scaled differential pressure corresponds to an estimate of differential pressure $\Delta P_{ACT}$. Pressure $IP_{HI}$, pressure $OP_{HI}$ and differential pressure $\Delta P_{HI}$ can be determined at beginning-of-life 102 of air filter 10 or determined from another air filter of the same type as air filter 10 at the beginning-of-life of the other air filter.

After measuring differential pressure $\Delta P_{ACT}$, a determination 108 is made as to whether differential pressure $\Delta P_{ACT}$ exceeds a threshold T. If differential pressure $\Delta P_{ACT}$ fails to exceed threshold T, differential pressure $\Delta P_{ACT}$ is measured 106 again and determination 108 is repeated. Optionally, the re-measurement can be delayed by a predetermined amount of time (e.g., one minute). Until threshold T is exceeded, pulse valve 40 is disabled and cleaning is disabled.

Threshold T is typically set at a level that allows an optimal amount of dust to build up in air filter 10 before cleaning of the air filter can begin. This recognizes that, generally, in dust collection and self-cleaning, some amount of dust on air filter 10 is desirable for maximum cleaning efficiency. Typically, the optimal amount of dust increases pressure differential $\Delta P_{HI}$ by 2-4 inches water column. Alternatively, threshold T can be set to allow more or less than an optimal amount of dust to build up, or to allow cleaning to begin immediately.

While not necessary, threshold T is typically based off pressure differential $\Delta P_{HI}$ and a caking factor $CA_F$. Caking factor $CA_F$ is a constant entered into the control module 42 that specifies an air pressure increase above pressure differential $\Delta P_{HI}$ when the vehicle engine is at full load or high idle and air filter 10 is new and clean. Caking factor $CA_F$ is typically set to achieve the optimum amount of dust buildup for filtration. Threshold T at full load or high idle is the summation of differential pressure $\Delta P_{HI}$ and caking factor $CA_F$. However, when not at full load or high idle, differential pressure $\Delta P_{HI}$ and caking factor $CA_F$ need to be scaled to determine threshold $$T = \left(\left(\frac{IP_{ACT}}{IP_{HI}}\right)\Delta P_{HI}\right) + \left(\left(\frac{IP_{ACT}}{IP_{HI}}\right)CA_F\right).$$

As should be appreciated, the scaling is done as described above to estimate differential pressure $\Delta P_{ACT}$.

Figure 11:
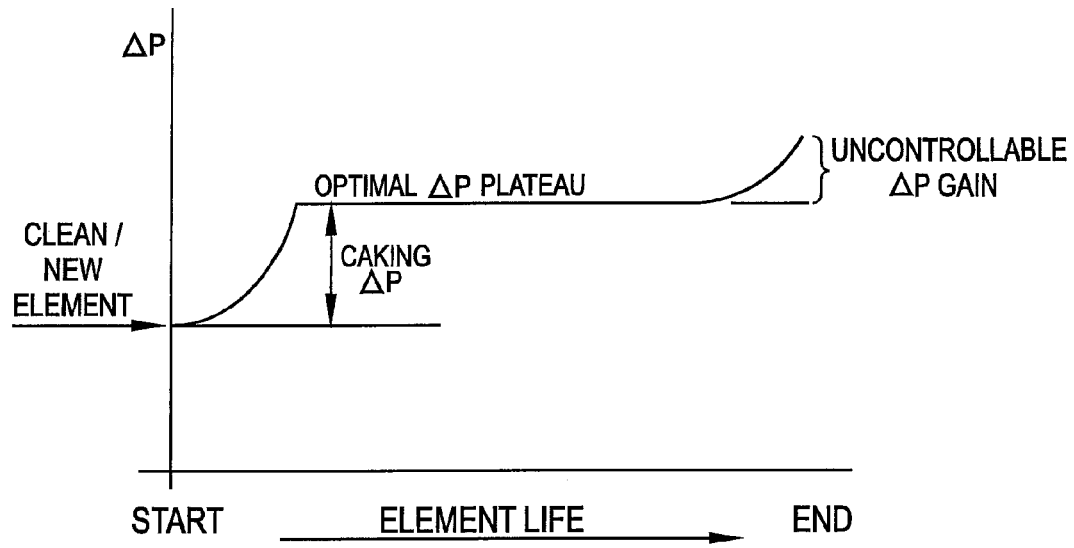
FIG. 11 is a graph illustrating differential pressure across the air filter of FIG. 1 over the life of the air filter when the method of FIG. 10 is employed.

With reference to FIG. 11, an example graphical representation of pressure differential $\Delta P_{ACT}$ over the life of air filter 10 is illustrated. The vertical axis corresponds to pressure differential $\Delta P_{ACT}$ (e.g., in inches water column) and the horizontal axis corresponds to the life of air filter 10 (e.g., in hours). As can be seen, pressure differential $\Delta P_{ACT}$ gradually increases before plateauing. The level at which pressure differential $\Delta P_{ACT}$ stops gradually increasing is defined by threshold T.

Once differential pressure $\Delta P_{ACT}$ exceeds threshold T, an optimal differential air pressure $\Delta P_{OPT}$ across air filter 10 at the current load is calculated 110. In some embodiments, differential pressure $\Delta P_{OPT}$ is the same as threshold T. In that regard, differential pressure $\Delta P_{OPT}$ is typically equal to $$\left(\left(\frac{IP_{ACT}}{IP_{HI}}\right)\Delta P_{HI}\right) + \left(\left(\frac{IP_{ACT}}{IP_{HI}}\right)CA_F\right).$$

Figure 12:
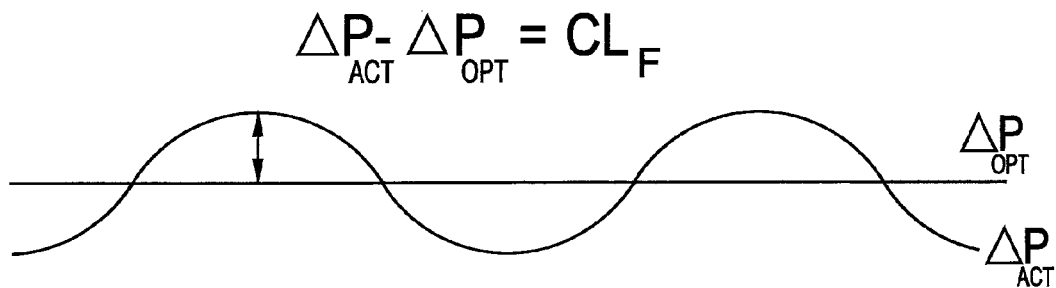
FIG. 12 is an enlarged view of a portion of the plateaued region of FIG. 11.

As should be appreciated, differential pressure $\Delta P_{OPT}$ varies as engine load changes (i.e., as the revolutions per minute (RPM) of the engine changes). For example, a reduction in RPM results in a reduction of differential pressure $\Delta P_{OPT}$. After calculating differential pressure $\Delta P_{OPT}$, the difference between differential pressure $\Delta P_{ACT}$ and differential pressure $\Delta P_{OPT}$ is calculated as a clogging factor $CL_F = \Delta P_{ACT} - \Delta P_{OPT}$, as illustrated in FIG. 12. FIG. 12 shows an enlarged view of a portion of the plateaued region of FIG. 11. The vertical axis corresponds to pressure differential $\Delta P_{ACT}$ and the horizontal axis corresponds to the life of air filter 10.

The foregoing calculated clogging factor $CL_F$ by downscaling differential pressure $\Delta P_{HI}$ and clogging factor $CA_F$. In some embodiments, clogging factor $CL_F$ can instead be calculated by upscaling differential pressure $\Delta P_{ACT}$ as follows:

$$CL_F = \left(\frac{IP_{HI}}{IP_{ACT}}\right)\Delta P_{ACT} - \Delta P_{HI} - CA_F.$$

Clogging factor $CL_F$ is input into a model relating clogging factor $CL_F$ to the pulse interval for cleaning pulses to calculate the current pulse interval. The model includes upper and lower bounds on the pulse interval, such as two minutes and one hour, respectively. Further, the model can include upper and lower bounds on clogging factor $CL_F$, which correspond to the lower and upper bounds on the interval, respectively. Typically, as clogging factor $CL_F$ increases, the pulse interval decreases, and vice versa. If clogging factor $CL_F$ is less than its lower bound, the pulse interval will be the greatest allowed pulse interval (e.g., one hour). Similarly, if clogging factor $CL_F$ is greater than its upper bound, the pulse interval will be the smallest allowed pulse interval (e.g., two minutes). The model is suitably defined by a user of control module 42, for example, by defining lower and upper bounds for clogging factor $CL_F$ and the pulse interval.

Figure 13:
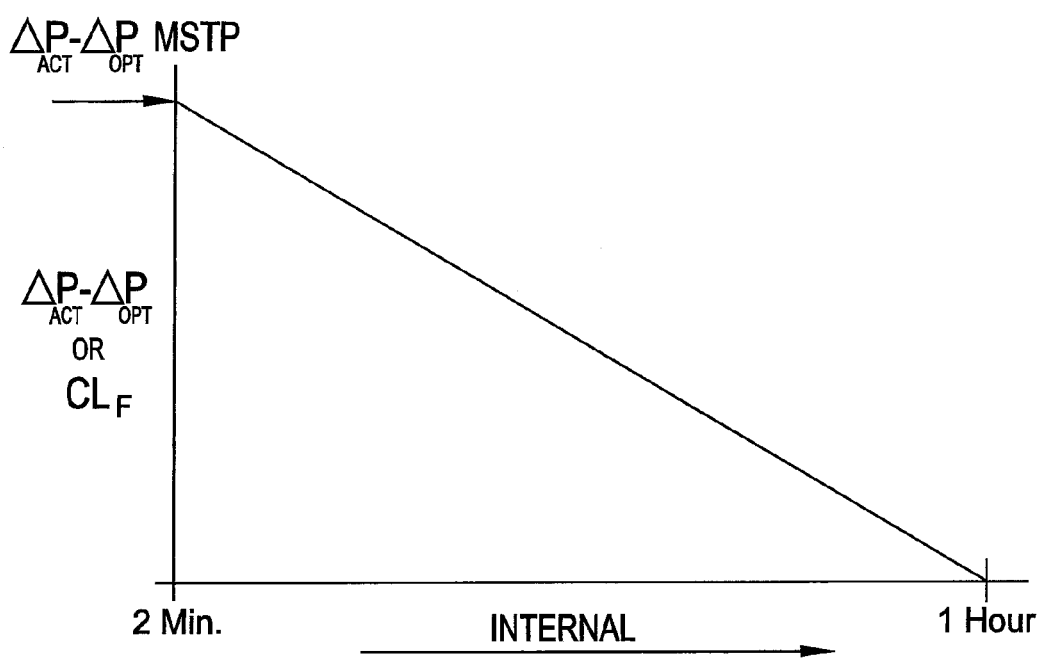
FIG. 13 is a graph representing a model relating the extent of clogging to pulse interval.

FIG. 13 illustrates a linear model relating clogging factor $CL_F$ to the pulse interval for cleaning pulses. The vertical axis corresponds to clogging factor $CL_F$, and the horizontal axis corresponds to the pulse interval spacing in time units. As illustrated, the pulse interval increases linearly as clogging factor $CL_F$ increases and decreases linearly as clogging factor $CL_F$ decreases. In some embodiments, the model may be exponential.

In some embodiments, the model adds a scaling factor to increase the pulse interval for low engine loads (e.g., low engine RPM). Namely, flow rate through air filter 10 decreases as engine load decreases. Through testing, it has been found that the optimal pulse interval for low engine loads does not necessarily correspond to the optimal pulse interval for higher engine loads. The pulse intervals at low engine loads are too high. Hence, a scaling factor can be added for lower engine loads to decrease the pulse interval. For example, the scaling factor can increasingly decrease the interval as engine load decreases.

After calculating the pulse interval, pulse valve 40 is pulsed 112 according to the pulse interval to clean air filter 10. A determination 114 is then made as to whether air filter 10 has reached end-of-life 104. So long as air filter 10 has not reached end-of-life 104, differential pressure $\Delta P_{ACT}$ is measured 116 again and the foregoing is repeated starting from calculating 110 differential pressure $\Delta P_{OCT}$. Optionally, the re-measurement can be delayed by a predetermined amount of time (e.g., one minute). If air filter 10 has reached end-of-life 104, a user of control module 42 can be notified by, for example, one or more of a light, audible alarm, display readout, or by interface to the vehicle computer and a display location of the vehicle manufacturer's choice.

End-of-life 104 can be determined in any number of ways. For example, end-of-life 104 can be a predetermined time duration from beginning-of-life 102. As another example, end-of-life 104 can be the time point at which differential pressure $\Delta P_{ACT}$ is no longer controllable at the maximum pulse frequency (i.e., lowest pulse interval). This can be determined through historical analysis of previous pulse intervals used with pulse valve 40. If the smallest pulse interval was previously used with pulse valve 40, and a predetermined amount of time has elapsed, with no improvement in clogging factor $CL_F$, differential pressure $\Delta P_{ACT}$ is no longer controllable. FIG. 11 illustrates this uncontrolled differential pressure $P_{ACT}$ can be monitored for signs that end-of-life 104 is reached.

In view of the foregoing, differential pressure $\Delta P_{ACT}$ is actively controlled by changing the pulse interval to maintain differential pressure $\Delta P_{ACT}$ as close to differential pressure $\Delta P_{OPT}$ as possible. As clogging factor $CL_F$ increases, the pulse interval of air valve 40 decreases. Eventually, clogging factor $CL_F$ should start to fall again, whether this is due to the increased pulse frequency or simply an environment with light dust loading. The pulse frequency will then decrease until clogging factor $CL_F$ increases again. In some instances, clogging factor $CL_F$ continues to increase due to an extremely dusty environment or air filter 10 reaching end-of-life 104.

Further, in view of the foregoing, method 100 estimates flow or a percentage of full flow without utilizing a flow sensor. It is done with independent vacuum transducers. Advantageously, the vacuum transducers provide simplicity, reliability, and cost reduction as compared to approaches which directly measure air flow with an anemometer or a pitot tube. However, it is to be appreciated that direct measurements of air flow can be employed with the approach described herein. Flow can be directly measured using, for example, a pitot tube or an anemometer When employing direct measurements of flow with method 100, differential pressure is replaced with the direct measurement of flow at inlet port 34. Further, the above described ratios are replaced with the ratio of flow $F_{ACT}$ during normal operation of the vehicle and flow $F_{HI}$ when the vehicle engine is at full load or high idle and air filter 10 is new and clean:

$$\frac{F_{ACT}}{F_{HI}}.$$

To illustrate, optimal flow $F_{OPT}$ can be calculated as $$F_{ACT} + \left(\left(\frac{F_{ACT}}{F_{HI}}\right)CA_F\right),$$

and clogging factor $CL_F$ can be calculated as $F_{ACT}-F_{OPT}$.

Figure 14:
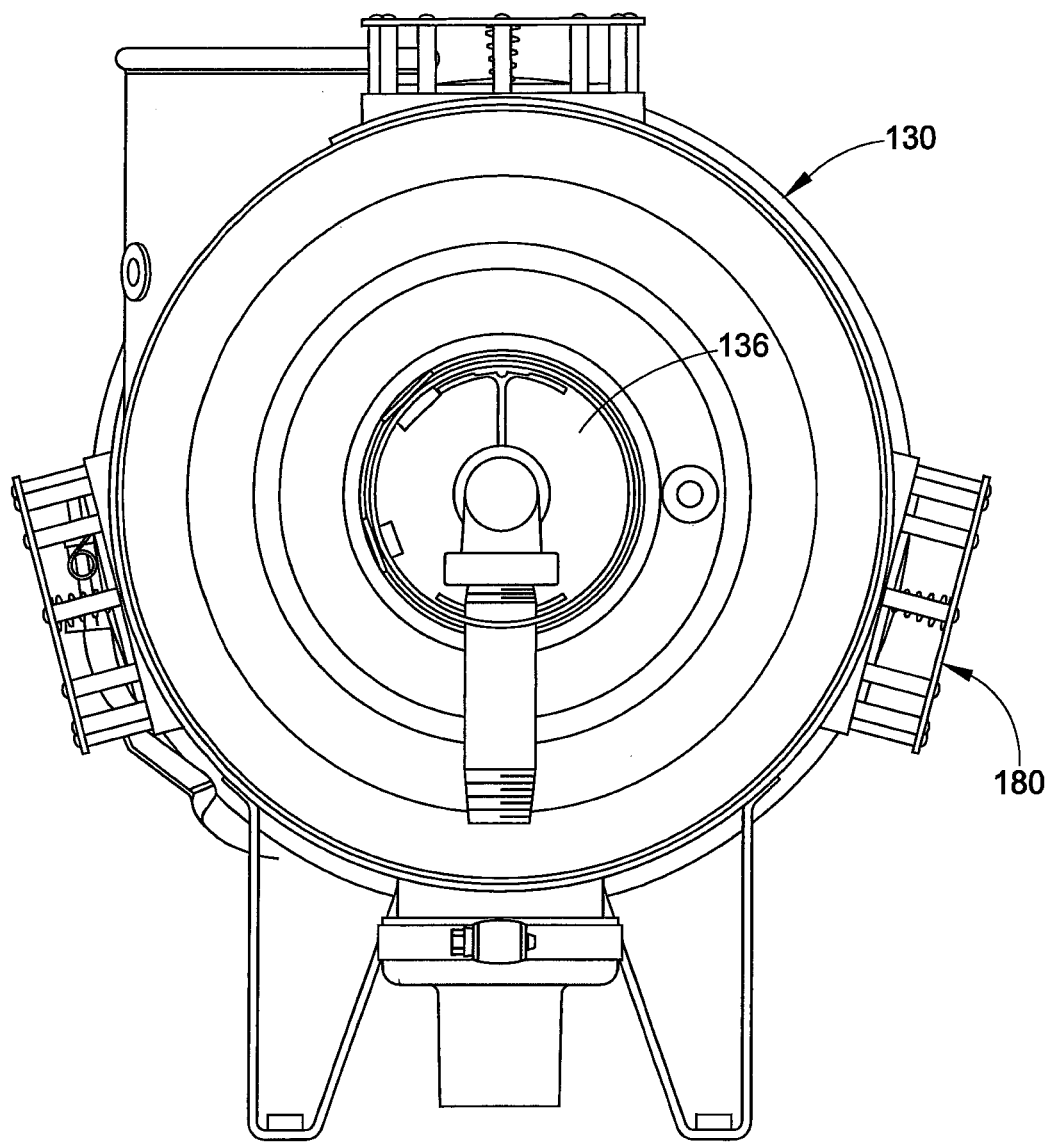
FIG. 14 is an end elevational view of another embodiment of air cleaner assembly according to the present disclosure.
Figure 15:
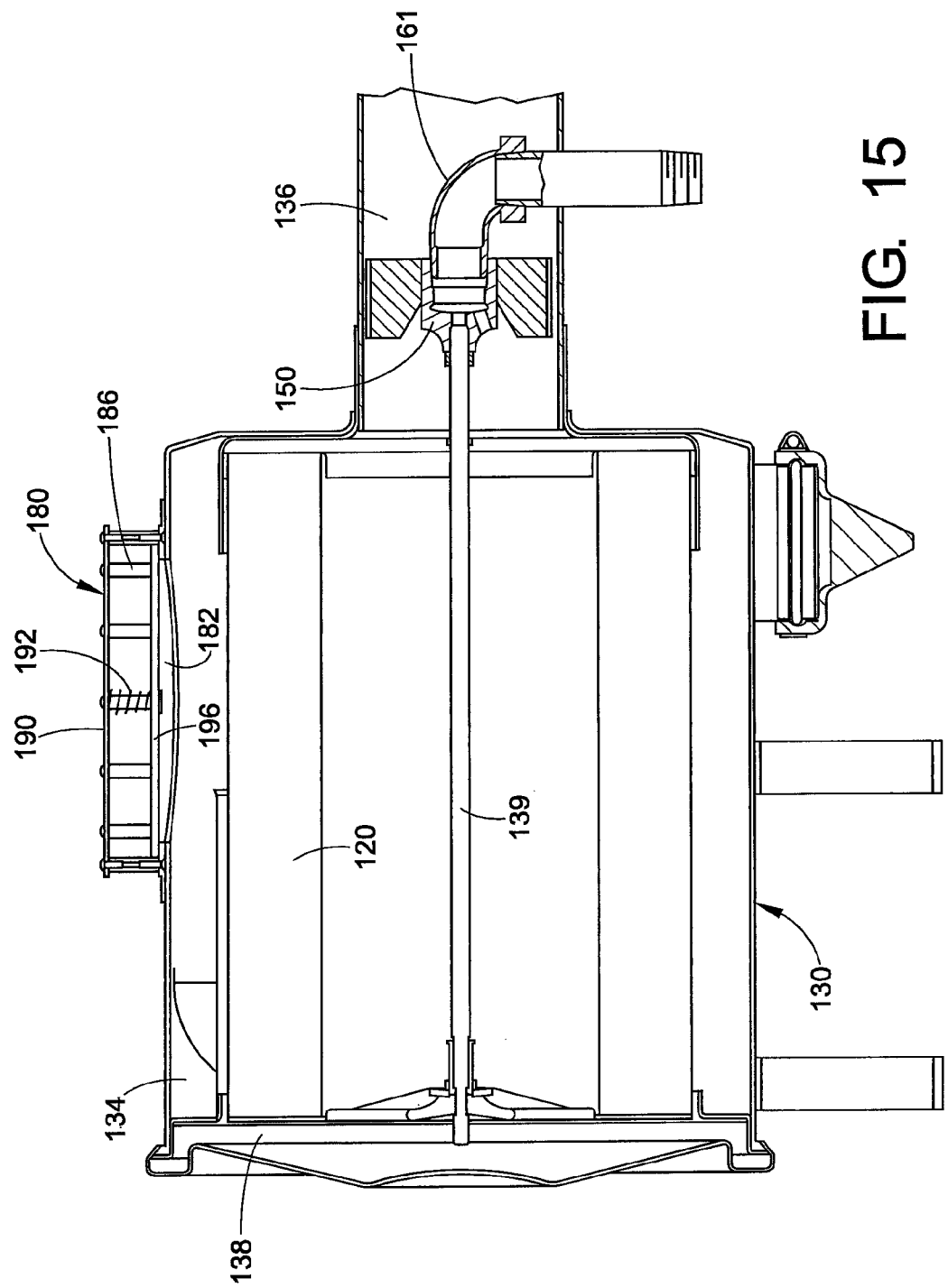
FIG. 15 is a side elevational view in cross section of the air cleaner assembly of FIG. 14 along lines 15-15.

With reference now to FIGS. 14 and 15, another embodiment of a cleaner assembly includes a filter 120 which may be tubular or cylindrical. In other words, it has a hollow interior. The filter is disposed within a cylindrical housing 130. The housing includes an inlet port 134 which may be located adjacent one end, the distal end, of the housing and an outlet port 136 which may be located adjacent another end, the proximal end, of the housing. The housing itself is cylindrical in nature with a hollow interior. The distal end of the housing 130 is closed by a lid 138. A connecting rod 139 extends centrally in the housing and mounts at one end to the lid 138. Another end of the connecting rod 139 mounts to a nozzle 150.

Figure 19:
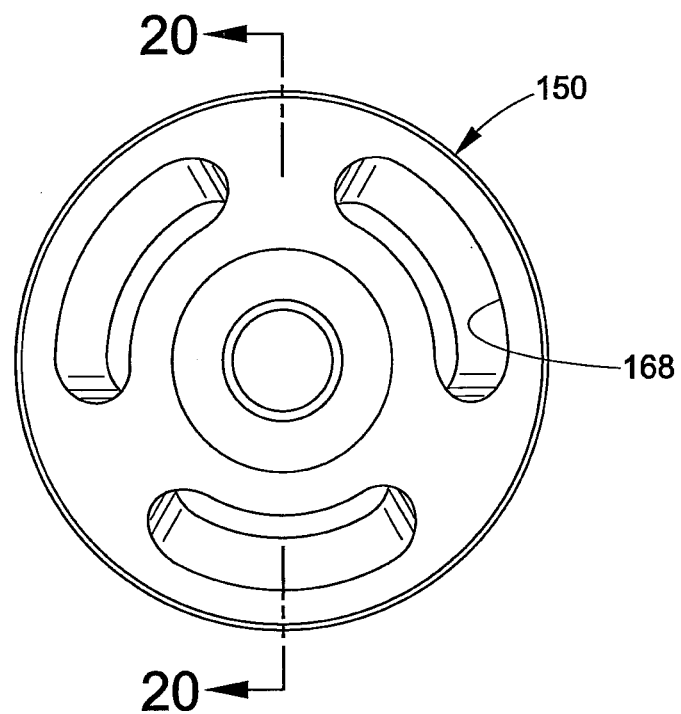
FIG. 19 is a front elevational view of the nozzle of FIG. 18.
Figure 18:
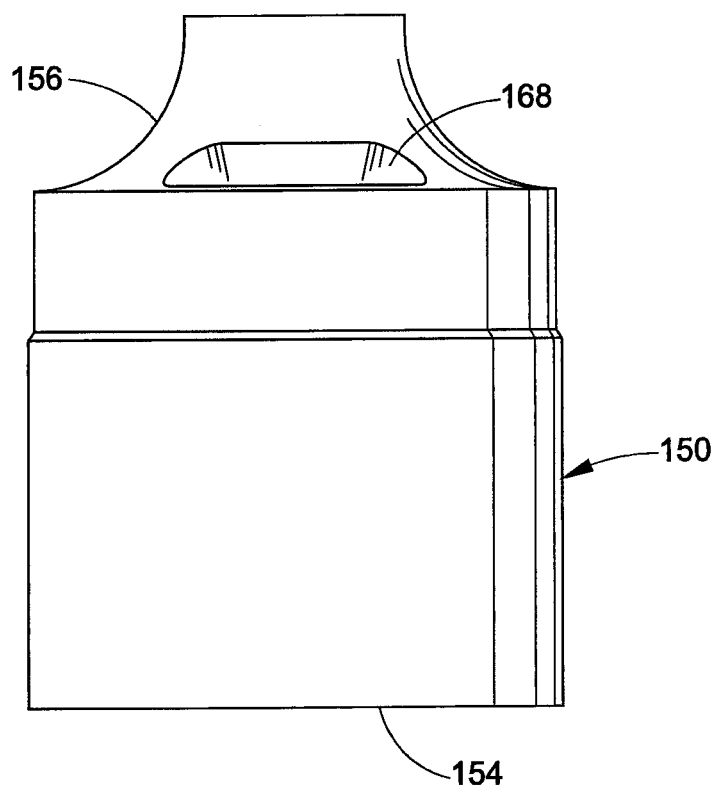
FIG. 18 is a side elevational view of a nozzle according to the present disclosure.
Figure 20:
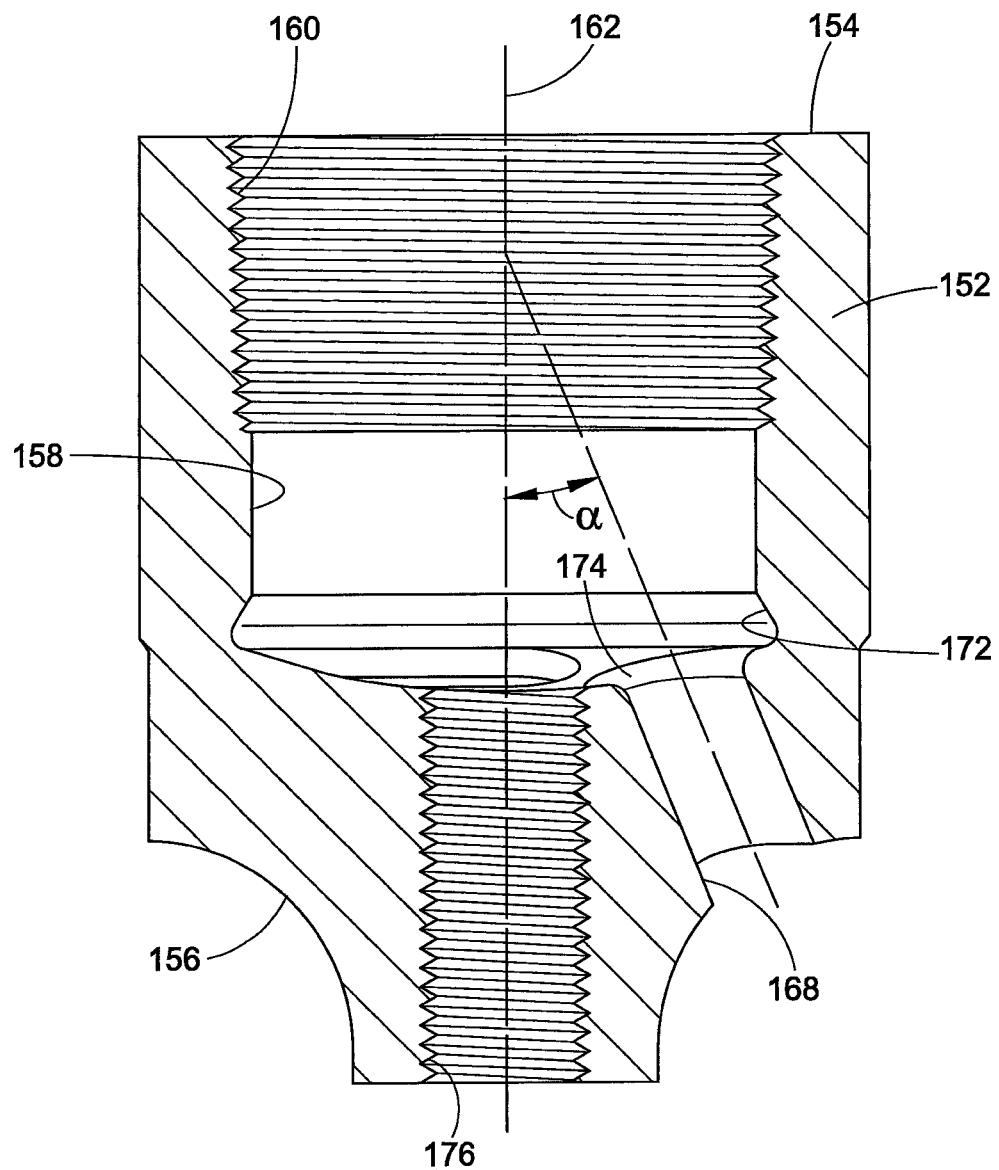
FIG. 20 is an enlarged cross sectional view of the nozzle of FIG. 19 along line 20-20.

With reference also now to FIGS. 18-20, the nozzle comprises a housing 152 including an inlet end 154 which is open and an outlet end 156 which is generally closed so as to define a hollow interior 158. The interior includes a threaded section 160 which accommodates a threaded end of a conduit 161 (FIG. 15). The nozzle comprises a longitudinal axis 162 and a central opening 164 through the outlet end 156 which is aligned with the longitudinal axis 162. Also provided are at least two side openings 168. As best seen in FIG. 19, the side openings 168 can be generally arcuate in nature, such that each of them extends at least 45 degrees around the circumference of a circle defined in the outlet end 156 encircling the central opening 164. In the embodiment shown, three such openings 168 are provided.

As is best seen in FIG. 20, the side openings extend at an angle α of approximately 22½ degrees from the longitudinal axis 162 of the nozzle. It should be apparent from FIG. 20 that the hollow interior 158 includes an enlarged diameter section 172 located immediately adjacent to inlet ends of the side openings 168 and that the inlet ends comprise radiused inlets 174. These allow for a relatively smooth flow of air through the nozzle. The outlet ends of the side openings 168 can be sharp and not radiused as shown in this embodiment. However, no air flows through the central opening 64. Rather, it is threaded as at 176 in order to accommodate a threaded end of the connecting rod 139. As is apparent from FIG. 15, the connecting rod mounts at one end to the nozzle 150 and at the other end to the filter 120 to retain it in place.

With continued reference to FIG. 15, the housing 130 also includes a pulse pressure vent assembly 180. This comprises a housing opening 182 which is surrounded by a plurality of posts or standoffs 186 to which is mounted a cover plate or stop 190. Disposed between the opening 182 and the cover plate 190 is a biasing member 192, such as a spring. The spring biases a blocking member 196 or diaphragm that selectively seals the housing opening 182. As is evident from FIG. 14, in one embodiment, the cylindrical housing 130 can include three such pressure vent assemblies 180. These can be located equiangularly around the periphery of the housing 130. However, other configurations, such as two or four vents, are also possible. Further, the angular locations of the vents does not need to be symmetrical.

Figure 17:
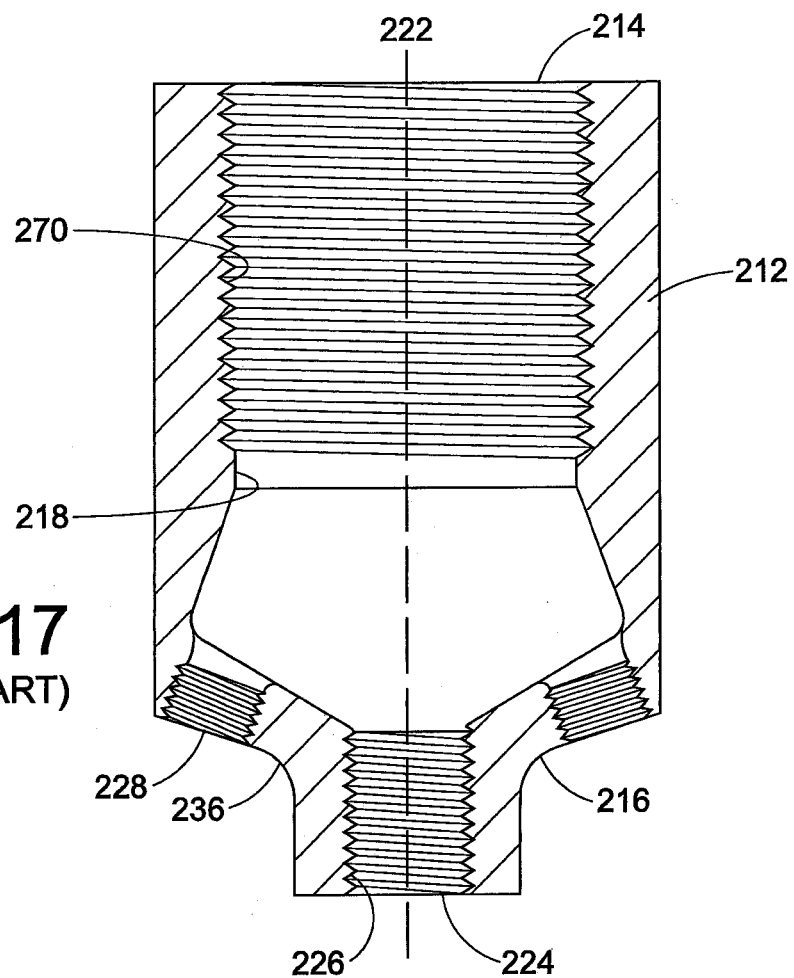
FIG. 17 is a cross sectional view of the nozzle of FIG. 16 along lines 17-17.
Figure 16:
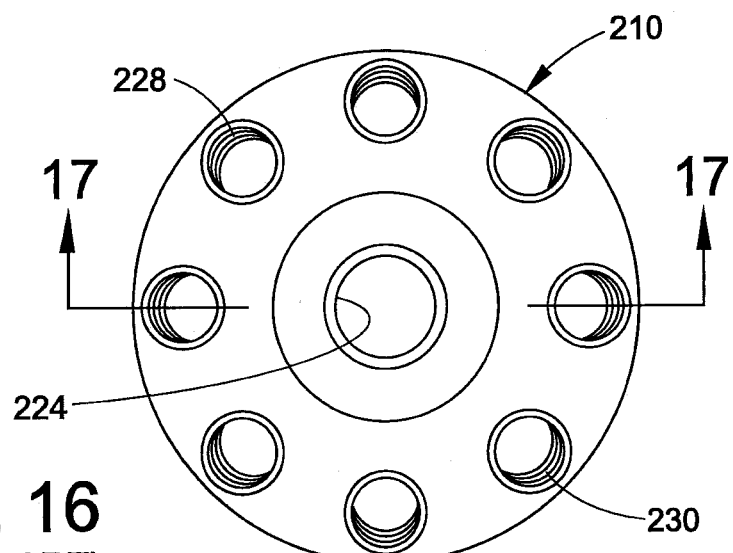
FIG. 16 is a front elevational view of a nozzle according to the prior art.

It has been found that the nozzle 150 illustrated in FIGS. 18-20 is advantageous in relation to a prior art nozzle 210 of the type which is illustrated in FIGS. 16 and 17. The prior art nozzle 210 includes a housing 212 with an inlet end 214 and an outlet end 216 so as to define a hollow interior 218. The hollow interior can include a threaded section 220. The nozzle includes a longitudinal axis 222 along which lies a central opening 224. The central opening is threaded as at 226. Also provided are a plurality of side openings 228, each of which is generally circular as best shown in FIG. 16. In the prior art, six or eight such side openings 228 can be provided in the housing 212. The side openings 228 are also threaded as at 230. The threading is believed to improve air flow through the side openings. It should be apparent from FIG. 17 that the side openings are provided on a radiused face 236 of the nozzle.

Figure 21:
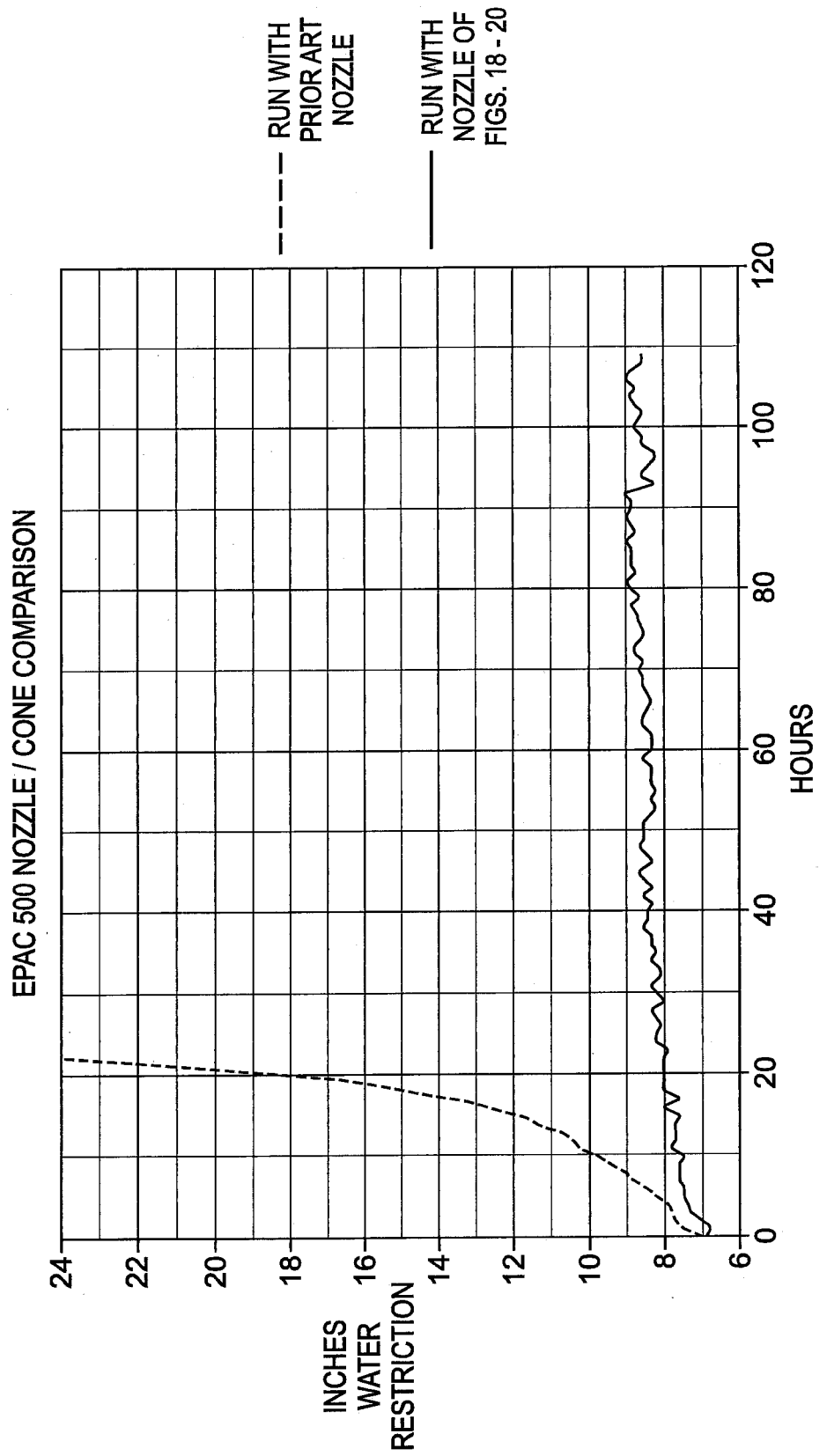
FIG. 21 is a graph illustrating inches of water restriction versus hours of operation comparing the prior art nozzle of FIGS. 16 and 17 and the nozzle illustrated in FIGS. 18-20.

With reference now to FIG. 21, through testing, it has been found that a prior art nozzle similar to the one illustrated in FIGS. 16 and 17 is disadvantageous from the standpoint that when employed in the air cleaner assembly illustrated in, e.g., FIGS. 14 and 15, the nozzle does not clean the filter sufficiently so as to retard or minimize a restriction of the filter, i.e., a reduction in the filtration capability of the filter, by a buildup of dirt and dust on the exterior periphery of the filter. Put another way, the restriction encountered during filtration, even after pulse cleaning the filter using the prior art nozzle is significantly larger than is the restriction encountered when employing the nozzle of FIGS. 18-20 and when using the same pulse duration and pressure of air in the same filter housing to clean the identical filter. The prior art nozzle tested had six threaded side holes which were at an angle of about 22½ degrees to a longitudinal axis of the nozzle. This nozzle, while it had good dispersion, did not release enough pressurized air to adequately clean the filter. The restriction of the filter, namely, dirt and dust build up on the exterior periphery of the filter, was such that it made it difficult for the filter to allow enough air flow through it to supply the internal combustion engine with an adequate amount of air. Such restriction becomes significant as early as 10 hours into the operation of the air cleaner assembly and is very pronounced at 20 hours or more. In contrast to the almost exponential increase in the restriction of the filter attempted to be cleaned with the prior art nozzle of FIGS. 16 and 17, the nozzle of FIGS. 18-20 is capable of repeatedly cleaning the same filter so that the restriction of the filter does not increase significantly as the hours of operation of the air cleaner assembly passes 60, 80 or even 100 hours.

Pulse volume testing performed on the prior art nozzle indicates that the relative energy released through this nozzle is not acceptable to effectively dislodge the dust from the filter element. Therefore, it was determined that increasing the open area of the nozzle was called for and, hence, arcuate shaped openings in the nozzle were developed. The angle of trajectory and the coverage area of the nozzle relative to the filter element appears to be advantageous at 22½ degrees in relation to the longitudinal axis of the nozzle.

It has been found that the prior art nozzle did not allow an adequate amount of pressurized air to flow at a high enough pressure to fully clean the filter. Although the dispersion of pressurized air to the interior periphery of the filter was adequate, the air pressure was inadequate. In order to increase the energy of the air exiting the nozzle so as to effectively pulse clean the cylindrical filter, arcuate apertures have been employed. It has been found that the lesser the number of openings, the better. Although testing data may be needed to confirm this, it would appear that the maximum number of openings which could be employed, while still providing air at a high enough pressure, would be four. Such a nozzle may prove useful on a large diameter cylindrical filter element that is very long. On the other hand, perhaps just two longer arcuate openings in the nozzle would be advantageous, because they would allow for slightly more open area at the outlet end of the nozzle. It is also believed that larger nozzles may allow for an increase in angular slot length, although it is believed that reducing the number of slots or arcuate openings would probably have a greater effect in increasing the throughput of air through the nozzle.

If four arcuate openings were employed, each opening could be on the order of 45 degrees. Thus, the four openings together would constitute a minimum of 180 degrees around the circumference of a circle centered on the openings. Four slots would decrease the open area percentage at the outlet end of the nozzle but would increase air velocity. Thus, a design with four slots might work better on filter elements which are longer. The nozzle illustrated in, e.g., FIG. 19 comprises three 60 degree openings, again amounting to a minimum of 180 degrees around the circumference of a circle.

In the embodiment of the nozzle shown in FIGS. 18-20, the slot entrance area of each nozzle is 0.108 inches squared. However, the exit area is 0.161 inches squared. This occurs because the size of the aperture in the nozzle increases from the entrance end to the exit end, thus, increasing the area of the opening and the measured width thereof.

Pulse cleaning of a filter is effective due to several factors. These include the pressure of the air, the direction and angle of dispersion, the volume of the air and the velocity of the air. In the chart of FIG. 21, it can be seen that the nozzle of FIGS. 18-20 adequately performs with the specific size and shape of the filter element illustrated at FIG. 15. That filter has a length of about 12.75 inches, an internal diameter of about 5.1 inches and an external diameter of about 9.1 inches, and hence a thickness of 2 inches. The filtration material of the filter used was Hollingsworth and Vose number FA6900NWFR. A planar filtration material was employed in a pleated filter arrangement. The results shown in FIG. 21 will change if a different size or shape is provided for the filter element and also if its thickness is changed or if the filtration material used is different, even if the air pressure and nozzle shape are kept constant.

Figure 22:
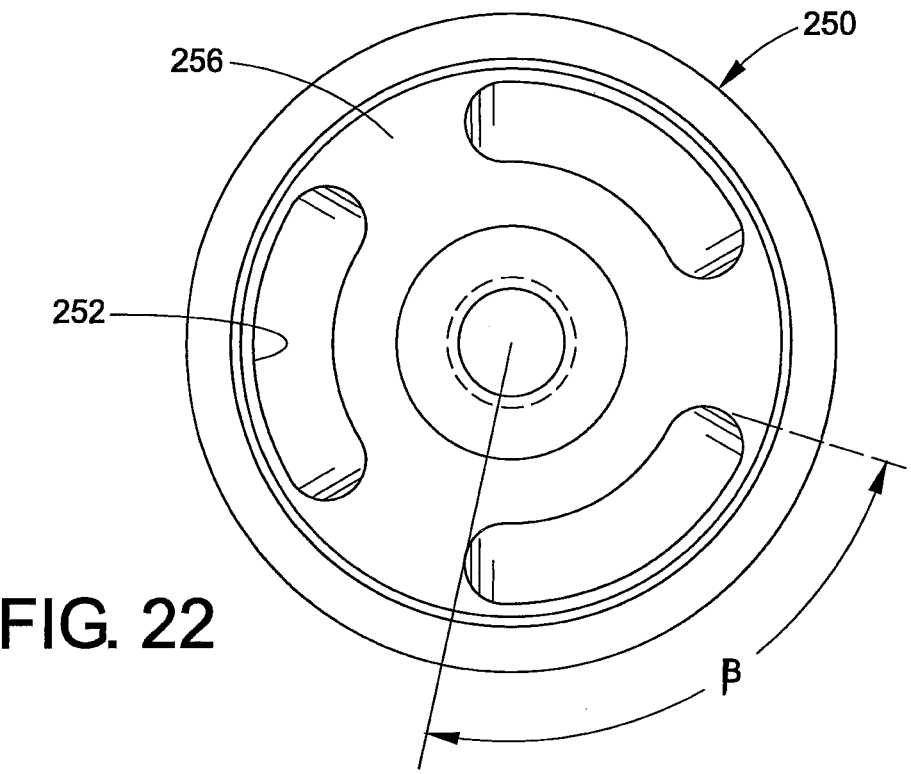
FIG. 22 is a front elevational view of a nozzle according to still another embodiment of the present disclosure.

In another embodiment of the present disclosure, as illustrated in FIG. 22, a nozzle 250 could be provided with a plurality of arcuate openings 252 (three in number in this embodiment), wherein each opening extends at an angle β of approximately 84 degrees at an outlet end 256 of the nozzle. It is believed that the larger sized openings 252 are advantageous from the perspective that they will allow an increased amount of pressurized air to flow at the outlet end of the nozzle. In this embodiment, therefore, about 252 degrees of open area are provided at the outlet end of the nozzle with the metal material of the nozzle at that surface constituting only 108 degrees of the circumference of a circle centered on the nozzle openings 252.

Figure 23:
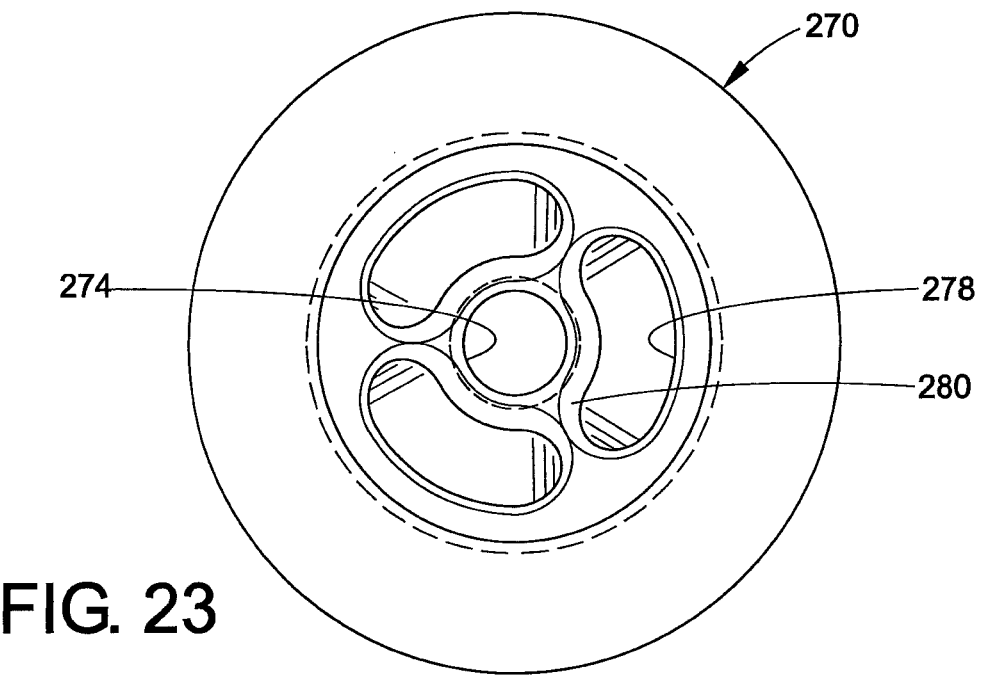
FIG. 23 is a rear elevational view of a nozzle according to a further embodiment of the present disclosure.

With reference now to FIG. 23, in accordance with still another embodiment of the present disclosure, a nozzle 270 can include a central opening 274 and a set of side openings 278, each having a filleted entrance as at 280, such that the openings lie adjacent to each other. In this embodiment, the peripheral openings almost touch each other, thereby providing the nozzle 270 with a yet further enlarged set of openings to more easily allow a flow of pressurized air when pulse cleaning a cylindrical filter. It appears that maintaining nozzle integrity is not an issue for concern with regard to the sizes of the arcuate slots for the nozzle disclosed herein. Rather, geometry is the limiting factor. The slots begin at a smaller diameter and gradually increase toward the exit of the nozzle. Thus, the inlet side of each slot in the nozzle can only have so much open area so that the filleted entrance is not compromised. The maximum size is illustrated in FIG. 23.

As to the diameter of the nozzle which can be used in an air cleaning environment, the nozzle diameter is going to control the cleaning area which needs to increase if the filter element gets larger. Since the nozzle is located in this embodiment in the outlet area of the air filter, it does block some of the outlet's flow area (see FIG. 15). Thus, the maximum diameter of the nozzle must be small enough that it does not cause significant restriction in the air outlet for the air which has been cleaned by the filter. In order to minimize such a restriction on nozzle diameter, one could increase the diameter of the outlet tube. However, the outlet tube diameter is often dictated by the size of the engine, meaning that this option may be limited. One way of addressing that issue would be to make the outlet tube have a larger diameter in the area where the nozzle lies and, downstream from the nozzle, taper down the diameter of the outlet tube to an appropriate size to match the size necessary for the engine in question.

At this point, applicants have not performed much experimental testing to better understand the effect of changing the number of openings in the nozzle or changing their size. However, it has been determined that to increase the energy conveyed by the pulsed air, arcuate openings of a minimum size are necessary in order that the cylindrical filter be adequately cleaned during pulse cleaning so that dirt built up on the exterior surface of the filter does not result in an unwanted increase in the restriction to flow through the filter during filtration after ten or twenty hours of use.

The disclosure has been described with reference to several embodiments. Obviously, modifications and alterations will occur to others upon a reading and understanding of this disclosure. It is intended to include all such modifications and alterations in so far as they come within the scope of the appended claims and the equivalents thereof.

We claim:
1. An air cleaner assembly comprising:
(a) a housing including an outer wall defining an air flow inlet, an air flow outlet, a sidewall having an opening therein, and a hollow interior section, the housing being openable for service access to the hollow interior section;
(b) a serviceable filter cartridge positioned in the housing hollow interior section;
  (i) the filter cartridge being selectively removable from the air cleaner housing; and
  (ii) the filter cartridge comprising filter media surrounding an open, central, interior;
(c) a pulse jet distribution arrangement communicating with the hollow interior section of the housing, including a nozzle configured to direct a pulse of compressed gas into the open, central, interior of the filter cartridge; and,
(d) an evacuation valve arrangement mounted to the housing adapted to direct dust radially out of the air cleaner housing, the valve arrangement comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

2. The assembly of claim 1 wherein the nozzle includes a forward end, a hollow interior and at least two spaced elongated arc-shaped openings located in the forward end and disposed radially inward of a circumference of the nozzle, each of the at least two elongated arc-shaped openings communicating with the hollow interior and extending at least 45 degrees around the nozzle forward end wherein the nozzle further comprises a central opening located in the forward end, the central opening being closed by one end of a connecting rod.

3. The assembly of claim 2 wherein the at least two spaced elongated openings comprise three elongated arc-shaped openings each extending at least 60 degrees.

4. The assembly of claim 2 wherein the at least two elongated openings are equally spaced around the nozzle forward end.

5. The assembly of claim 2 wherein the at least two spaced elongated openings are oriented at an angle of 22.5 degrees in relation to an axial centerline of the nozzle.

6. The assembly of claim 1 wherein the evacuation valve arrangement further comprises a stop mounted to the frame and spaced from the housing, wherein the diaphragm is positioned between the stop and the housing.

7. The assembly of claim 6 wherein the stop comprises a cover plate.

8. The assembly of claim 1 wherein the diaphragm is positioned outside the housing so that it is exposed to the environment and the evacuation valve arrangement permits a radial flow of dust away from the housing.

9. The assembly of claim 1 wherein the diaphragm extends in a single plane in the closed position.

10. The assembly of claim 1 wherein the frame comprises a plurality of spaced posts.

11. A self-cleaning air filter assembly connected to an associated compressed air source comprising:
a housing defining a chamber located therein;
a hollow filter element disposed within the chamber such that an open interior volume is defined within the filter element and an exterior volume is defined between the filter element and an interior wall of the housing, whereby during a filtering cycle a negative pressure differential between the interior volume and the exterior volume draws airflow inward through the filter element and during a self-cleaning cycle a positive pressure differential between the interior volume and the exterior volume forces airflow outward through the filter element;
a nozzle configured to direct a pulse of compressed gas into the interior volume of the filter element;
a valve in communication with the housing and connected to the associated compressed air source for selectively releasing a pulse of compressed air into the nozzle whereby dust is dislodged from an exterior surface of the filter element into the housing chamber; and
a vent mounted to a side wall of the housing, over an opening therein, for venting the pulse of compressed air from the housing, the vent comprising a frame, a diaphragm mounted for reciprocation in relation to the frame and shiftably seated over the sidewall opening between an open position spaced from the sidewall opening and a closed position covering the sidewall opening, and a spring for urging the diaphragm into the closed position.

12. The assembly of claim 11 wherein the nozzle comprises a forward end, a hollow interior and at least two spaced elongated arc-shaped openings located in the forward end and disposed radially inward of a circumference of the nozzle, each of the at least two elongated arc-shaped openings communicating with the hollow interior and extending at least 45 degrees around the nozzle forward end wherein the nozzle further comprises a central opening located in the forward end, the central opening being closed by one end of a connecting rod.

13. The assembly of claim 12 wherein the at least two spaced elongated arc-shaped openings comprise three elongated openings each extending at least 60 degrees.

14. The assembly of claim 13 wherein the three elongated openings are equally spaced around the nozzle forward end and are located on a common circle.

15. The assembly of claim 11 wherein the vent further comprises a stop mounted to the frame and spaced from the housing and wherein the diaphragm is positioned between the stop and the housing.

16. The assembly of claim 15 wherein the spring is positioned between the diaphragm and the stop.

17. The assembly of claim 11 wherein the diaphragm is held in the frame.

18. The assembly of claim 11 wherein the frame comprises a plurality of spaced posts.

* * * * *